(12) United States Patent
Shelby et al.

(10) Patent No.: US 8,057,726 B2
(45) Date of Patent: Nov. 15, 2011

(54) SCREW DESIGNS HAVING IMPROVED PERFORMANCE WITH LOW MELTING PET RESINS

(75) Inventors: Marcus David Shelby, Fall Branch, TN (US); Michael Eugene Donelson, Kingsport, TN (US); Frederick Leslie Colhoun, Kingsport, TN (US); Steven Lee Stafford, Gray, TN (US); Mark Edward Stewart, Kingsport, TN (US); Stephen Weinhold, Kingsport, TN (US); Edward Lewis Boochard, Kingsport, TN (US); Robert Noah Estep, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 305 days.

(21) Appl. No.: 12/471,891

(22) Filed: May 26, 2009

(65) Prior Publication Data
US 2009/0315219 A1  Dec. 24, 2009

Related U.S. Application Data

(60) Provisional application No. 61/074,033, filed on Jun. 19, 2008.

(51) Int. Cl.
*B29C 45/60* (2006.01)
(52) U.S. Cl. .......... 264/328.1; 264/328.18; 264/328.19; 264/331.15
(58) Field of Classification Search ............... 264/328.1, 264/328.17, 328.18, 328.19, 328.15, 331.15; 366/76.3, 348
See application file for complete search history.

(56) References Cited

U.S. PATENT DOCUMENTS
3,596,320 A * 8/1971 Manning et al. ............. 425/199
(Continued)

FOREIGN PATENT DOCUMENTS
EP  1 574 538 A1  9/2005
(Continued)

OTHER PUBLICATIONS

Billmeyer Jr, Fred W.; "Methods for Estimating Intrinsic Viscosity"; Journal of Polymer Science; 1949; vol. IV; pp. 83-86.
(Continued)

*Primary Examiner* — Yogendra Gupta
*Assistant Examiner* — Emmanuel S Luk
(74) *Attorney, Agent, or Firm* — Oblon, Spivak, McClelland, Maier & Neustadt, L.L.P.

(57) ABSTRACT

Disclosed is a process for a melt processing a polyethylene terephthalate resin characterized by one or more of the following. The polyester particles may have at least two melting peaks wherein one of the at least two melting peaks is a low peak melting point with a range from 140° C. to 220° C., or from 140° C. to 230° C., and having a melting endothermic area of at least the absolute value of 1 J/g. The polyester particles may have one or more melting peaks at least one of which when measured on a DSC first heating scan has a heating curve departing from a baseline in the endothermic direction at a temperature of less than or equal to 200° C. The polyester particles may have an It.V. at their surface which is less than 0.25 dL/g higher than the It.V. at their center. The polyester particles may have not been solid stated. The melt processing device comprises a screw with a total length, L, a feed zone length in the range from 0.16L and 0.45L, a taper angle, $\phi$, in the range from 0.5 degrees and 5.0 degrees and a compression ratio, CR, in the range from 2.0 and 5.0.

17 Claims, 1 Drawing Sheet

U.S. PATENT DOCUMENTS

| | | | |
|---|---|---|---|
| 3,767,754 A | | 10/1973 | Manning et al. |
| 4,729,662 A | * | 3/1988 | O'Brien ............... 366/89 |
| 5,093,437 A | * | 3/1992 | Komiya et al. ........ 525/440.06 |
| 5,110,849 A | * | 5/1992 | Karasawa et al. ......... 524/87 |
| 5,268,438 A | * | 12/1993 | Carson et al. .......... 526/273 |
| 6,130,290 A | * | 10/2000 | Troy et al. ............ 525/63 |
| 6,911,486 B2 | * | 6/2005 | Mimura et al. ........ 523/172 |
| 7,063,929 B2 | * | 6/2006 | Yuasa et al. ......... 430/137.1 |
| 7,459,113 B2 | | 12/2008 | Colhoun et al. |
| 7,491,788 B1 | * | 2/2009 | Leenders et al. ....... 528/196 |
| 7,696,274 B2 | * | 4/2010 | Terada et al. ........ 524/495 |
| 7,879,938 B2 | * | 2/2011 | Hager et al. ......... 524/401 |
| 2003/0100637 A1 | * | 5/2003 | Mimura et al. ........ 524/89 |
| 2004/0137354 A1 | * | 7/2004 | Yamazaki et al. ..... 430/109.4 |
| 2004/0152006 A1 | * | 8/2004 | Teshima ............ 430/109.4 |
| 2005/0080226 A1 | * | 4/2005 | Watanabe ........... 528/272 |
| 2006/0046004 A1 | | 3/2006 | Ekart et al. |
| 2006/0047102 A1 | | 3/2006 | Weinhold et al. |
| 2006/0234073 A1 | * | 10/2006 | Hale et al. ........... 428/474.4 |
| 2006/0264580 A1 | * | 11/2006 | Mullen ............... 525/439 |
| 2007/0248778 A1 | | 10/2007 | Kezios et al. |
| 2010/0286357 A1 | * | 11/2010 | Matsumura et al. ...... 528/59 |

FOREIGN PATENT DOCUMENTS

| | | |
|---|---|---|
| JP | 05 031775 | 2/1993 |
| JP | 08 318561 | 12/1996 |
| WO | WO 97/23540 | 7/1997 |

OTHER PUBLICATIONS

Otto, Brigitta, et al.; "Advances in PET for Bottle-Grade Chips"; PET Processing Technology; www.fiberjournal.com; Aug. 2006; pp. 44-45.

Osswalk, Tim A. and Hernandez-Ortiz, Juan P.; "3.2 Mixing Processes"; Polymer Processing: Modeling and Simulation; 2006; pp. 125-137; Hanser Gardner Publications; Cincinnati, Ohio.

Van Endert, E.; "Melt-to-Resin: A New Method to Produce PET Resin Economically Without SSP"; PET Processing Technology; www.fiberjournal.com; Aug. 2006; pp. 39-41.

Notification of Transmittal of the International Search Report and the Written Opinion of the International Searching Authority, or the Declaration date of mailing Oct. 9, 2009 received in corresponding International Application No. PCT/US2009/003335.

Office Action issued Aug. 9, 2011, in European Patent Application No. 09 767 011.1.

* cited by examiner

SCREW DESIGNS HAVING IMPROVED PERFORMANCE WITH LOW MELTING PET RESINS

CROSS-REFERENCE TO RELATED APPLICATIONS

This application claims priority to U.S. Provisional Application Ser. No. 61/074,033, filed Jun. 19, 2008, the disclosure of which is incorporated herein by reference in its entirety.

FIELD OF THE INVENTION

This invention pertains to optimal processing of PET resins characterized as having low melting peak temperatures, small molecular weight gradients within the pellets, or not having been solid stated, to maximize throughput in a melt processing device while minimizing quality defects such as bubbles and gels.

BACKGROUND OF THE INVENTION

Polyethylene terephthalate (PET) resins for the bottle industry have traditionally been produced by solid state manufacturing methods. In solid stating, a low molecular weight PET is first made by a melt phase process prior to being pelletized and cooled. After pelletization, the PET is then passed through a crystallizer followed by a solid stating apparatus, where polymerization continues until the molecular weight (or IV) target is reached. The key feature of solid stating is that it is performed at a temperature below the melting point (Tm) of the resin so pellets are able to crystallize to very high levels. Additionally, the long annealing times in solid stating allow the crystals to become more uniform and "perfected," which consequently increases their melting point. Typical solid-stated pellets have a Tm of about 240° C.

In contrast to solid-stated PET, the recently introduced "melt-phased only" resins are built to final IV in the primary reactor (and above Tm) without any subsequent solid phase polymerization (see for example, the following references (1) E. Van Endert, *International Fiber Journal*, pp 39-41, August 2006; (2) Brigitta Otto, et al, *International Fiber Journal*, pp 44-45, August 2006, (3) US20060046004 and (4) US20060047102. Melt phased resins have advantages in flavor sensitive products like beer, juices, water, etc. since acetaldehyde generation can be more tightly controlled (acetaldehyde is a degradation by-product of PET with a sweet, fruity flavor that forms when the resin gets too hot). For melt-phased only resins, crystallization of the pellets normally occurs from the heat retained in the material during the pelletization process so the melting point and total crystallinity are much lower than traditional solid-stated resins. If desired, additional annealing can be performed to increase the Tm and crystallinity, however, this adds an extra processing step. Typical low peak melting points (Tm1) of melt phased PET resins range from about 150 to 230° C.

Optimum melt processing conditions for traditional solid-stated polyester resins have developed over the years. These conditions include screw design for extruders and injection molding machines, operating temperatures, throughput rates or screw rpm, and the like. The optimum melt processing conditions allow maximum production rate of articles such as preforms or sheet with minimal quality defects. Given the differences in low peak melting point and crystallinity of melt-phased only resins compared to solid-stated resins, a need arises to re-optimize melt processing conditions for the new melt phased only resins.

In addition to maximizing throughput rate in terms of faster extrusion/injection rates, there is also a need for a resin and process that can be run colder than with current solid-stated PET. A colder polymer melt takes less time to solidify in the mold, and therefore can be ejected faster, giving a shorter overall cycle time. There is also a secondary benefit in that colder resins produce lower levels of acetaldehyde. The limitation on the lowest practicable melt processing temperature when processing solid-stated resins comes about because of their high Tm and very high crystallinity, preventing them from being molded below about 280 to 290° C. The melt must be made sufficiently hot so as to fully melt out all crystallinity, otherwise residual crystal defects that carry over serve as nucleation points during cooling. This nucleation significantly accelerates the rate of crystallization in the preform and can lead to unacceptable haze and poor blow molded properties in the final bottle.

Melt-phased only resins are less prone to these haze-forming residual crystals given their lower Tm and crystallinity. Therefore it is hypothesized that it should be possible to run these melt phased resins colder and with a faster cycle time. The hurdle to achieving this goal, however, has been the bubble and unmelt defects encountered when using traditional screw designs. These defects have forced processors to run hotter and/or slower in order to compensate. Thus, there is also a need for a screw design that will provide a uniform and relatively defect free extrudate at colder temperatures without sacrificing throughput rate. Such a screw would enable shorter cycle times and reduced acetaldehyde generation rates. The present invention addresses these needs.

SUMMARY OF THE INVENTION

We have discovered a process for melt processing a polyester comprising: (a) introducing polyester particles into a melt processing device, (b) melting the polyester particles in the melt processing device to produce a molten polyester, and (c) forming an article from the molten polyester. The polyester particles comprise (i) a carboxylic acid component comprising at least 80 mole percent of the residues of terephthalic acid, derivatives of terephthalic acid, or mixtures thereof, and (ii) a hydroxyl component comprising at least 80 mole percent of the residues of ethylene glycol, based on 100 mole percent of the carboxylic acid component residues and 100 mole percent of the hydroxyl component residues in the polyester particles. The polyester particles are further characterized by one or more of the following. The polyester particles may have at least two melting peaks wherein one of the at least two melting peaks is a low peak melting point with a range from 140° C. to 220° C., or from 140° C. to 230° C., and having a melting endothermic area of at least the absolute value of 1 J/g. The polyester particles may have one or more melting peaks at least one of which when measured on a DSC first heating scan has a heating curve departing from a baseline in the endothermic direction at a temperature of less than or equal to 200° C. The polyester particles may have an It.V. at their surface which is less than 0.25 dL/g higher than the It.V. at their center. The polyester particles may have not been solid stated. The melt processing device comprises a screw with a total length, L, a feed zone length in the range from 0.16 L and 0.45 L, a taper angle, $\phi$, in the range from 0.5 degrees and 5.0 degrees and a compression ratio, CR, in the range from 2.0 and 5.0.

We have also discovered a process for melt processing polyester comprising (a) introducing polyester particles into a melt processing device, (b) melting the polyester particles in the melt processing device to produce a molten polyester, and (c) forming an article from the molten polyester. The polyester particles comprise (i) a carboxylic acid component comprising at least 80 mole percent of the residues of terephthalic acid, derivatives of terephthalic acid, or mixtures thereof, and (ii) a hydroxyl component comprising at least 80 mole percent of the residues of ethylene glycol, based on 100 mole percent of the carboxylic acid component residues and 100 mole percent of the hydroxyl component residues in the polyester particles. The polyester particles are further characterized by one or more of the following. The polyester particles may have at least two melting peaks wherein one of the at least two melting peaks is a low peak melting point with a range from 140° C. to 220° C., or from 140° C. to 230° C., and having a melting endothermic area of at least the absolute value of 1 J/g. The polyester particles may have one or more melting peaks at least one of which when measured on a DSC first heating scan has a heating curve departing from a baseline in the endothermic direction at a temperature of less than or equal to 200° C. The polyester particles may have an It.V. at their surface which is less than 0.25 dL/g higher than the It.V. at their center. The polyester particles may have not been solid stated. The melt processing device comprises a screw with a total length, L, a feed zone length, f*L (i.e. f multiplied times L), wherein f represents a fraction of the total screw that is the feed zone, a taper angle, $\phi$, in degrees, and a compression ratio, CR, such that the following formula is satisfied:

$$-0.4 \leq 7.64*f - 0.96*CR - \phi + 0.601 \leq +0.4$$

DETAILED DESCRIPTION

Definitions

Figure 1:
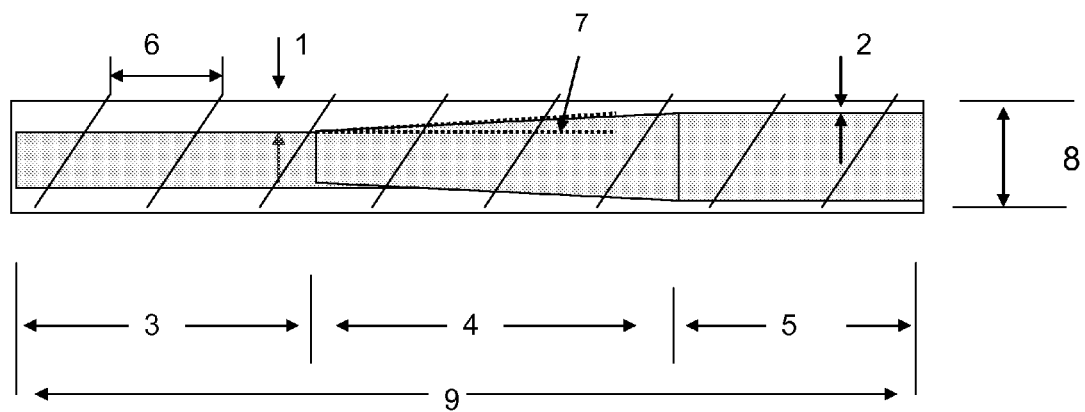
FIG. 1 illustrates a general purpose screw.

"Article" refers to any object of manufacture into which a polyester polymer may be formed. Nonlimiting examples of articles include bottle preforms, sheets, film, trays, rods, tubes, lids, filaments, and fibers.

"Back Pressure" (or "backpressure") refers to the operator-defined force that opposes the retraction of an injection molding screw while turning. As the screw turns, it conveys polymer forward into a melt cushion region at the end of the screw while simultaneously translating towards the back of the barrel. High back pressure slows the rate of screw retraction so that more screw turning and shear energy is imparted to the polymer.

"Barrel temperature" refers to temperature set point for the barrel in which the screw is contained. It represents the temperature applied to the polymer.

"Bubbles" refer to defects in polyester articles characterized by a void, which may include the entrapment of air, within the polyester matrix.

"Carboxylic acid component", "carboxylic acid residues" or "carboxylic acid component residues" refers to the carboxylic acid moiety that is present in the polyester. It is understood that these residues can result from reacting carboxylic acids or the corresponding acid anhydrides, esters, and acid chlorides of a carboxylic acid.

"Compression ratio" refers to how much the screw compacts the resin during melting and transition. It is the ratio of the feed zone depth divided by the melting zone depth. For variable flight depth metering zones, it is assumed that the melting zone depth is the average of the shallowest and deepest depths.

"Feed zone length" refers to the length of the screw where the pellets are first added and conveyed. It can be expressed in terms of actual length, or in terms of the fraction f, based on the total length of the screw L, such that f*L (i.e. f multiplied by L) is the actual feed zone length. Alternately, since most screws are at or near square pitch, it is commonplace to represent the feed zone length in units of "turns", or "diameters (D)". For example, a feed zone length that is "10D" on a screw with a diameter of 1 inch, would have an actual feed zone length of 10 inches. Similarly, within this feed zone, there would be approximately 10 turns or twists of the screw (if square pitched).

"Gels" or "unmelts" refers to defects in a polyester article characterized by a portion of semi-crystalline material imbedded in an otherwise substantially amorphous matrix, or substantially hard particles relative to the polyester matrix that show as an optical inhomegeneity.

"Hydroxyl component", "hydroxyl residues" or "hydroxyl component residues" refers to the hydroxyl moiety that is present in the polyester.

"Injection molder" refers to a melt extruder that is coupled with a plunger that forces the polymer melt into an article with a specific shape. Injection molders can be single or multiple staged.

"Intrinsic viscosity" or "It.V." refers to values set forth in dL/g units as calculated from the inherent viscosity typically measured at 25° C. in 60/40 wt/wt phenol/tetrachloroethane according to the calculations immediately prior to Example 1 below. Inherent and intrinsic viscosity are widely used as indirect measurements of molecular weight in polyester processes. For the measurement of It.V. gradient in pellets, the inherent viscosity is calculated from the weight-averaged molecular weight which is measured using GPC.

"Melt extruder" refers to a machine with a rotating screw in a barrel that plasticates polymer particles into a polymer melt stream. In an extruder, the screw generally turns continuously, but does not otherwise translate or reciprocate.

"Melting peak" refers to a local extrema in the DSC first heating scan performed on an resin according to the method described below.

"Melt processing device" refers to the process stage wherein a solid polyester polymer is melted and formed into an article.

"Molten polyester" refers to a polyester above its melting peak temperature, and above its low melting peak temperature if more than one melting peak exists.

"Percent of crystallinity" refers to the weight percent of the polyester that is in a crystalline state as opposed to an amorphous state.

"Polyester particles" refers to discrete objects of polyester polymer such as polyester pellets.

"Residue" refers to the moiety that is the resulting product of the chemical species in a particular reaction scheme or subsequent formulation or chemical product, regardless of whether the moiety is actually obtained from the chemical species. The reaction of a dicarboxylic acid compound with a hydroxyl compound during the preparation of the polyester polymer is not restricted to the stated mole % ratios since one may utilize a large excess of a hydroxyl compound if desired, e.g. on the order of up to 200 mole % relative to the 100 mole % of polycarboxylic acid used. The polyester polymer made by the reaction does, however, contain the stated amounts of aromatic dicarboxylic acid residues and hydroxyl residues. Thus, an ethylene glycol residue in a polyester refers to one or more —OCH$_2$CH$_2$O— repeat units in the polyester regardless of whether ethylene glycol is used to prepare the polyester.

"Solid stating" refers to a polyester processing step conducted on a solid polyester, typically in the form of particles or pellets, wherein polymerization techniques are employed which result in increasing the It.V. of the particles more than 0.03 dL/g. Solid-stated polyesters have been subject to solid stating to increase their molecular weight.

"Taper angle" or "transition angle" refers to the slope at which the feed zone depth of the screw changes to the metering zone depth and is expressed in units of degrees. For screws with multiple transition sections, it is the taper angle for the first transition that is most important for the present invention. See FIG. 1.

"Virgin polyester" refers to polyester directly from a manufacturing process that has not been previously extruded, as well as polyester scrap, or polyester regrind. Virgin polyester is in contrast to post-consumer polyester which has been molded into an article, used by a consumer, and entered the recycle stream either for mechanical or chemical treatment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

One embodiment of the invention is a process for melt processing polyester comprising (a) introducing polyester particles into a melt processing device, (b) melting the polyester particles in the melt processing device to produce a molten polyester, and (c) forming an article from the molten polyester. The polyester particles comprise (i) a carboxylic acid component comprising at least 80 mole percent of the residues of terephthalic acid, derivatives of terephthalic acid, or mixtures thereof, and (ii) a hydroxyl component comprising at least 80 mole percent of the residues of ethylene glycol, based on 100 mole percent of the carboxylic acid component residues and 100 mole percent of the hydroxyl component residues in the polyester particles. The polyester particles are further characterized by one or more of the following conditions. The polyester particles may have at least two melting peaks wherein one of the at least two melting peaks has a low peak melting point with a range from 140° C. to 220° C., or from 140° C. to 230° C., and having a melting endothermic area of at least the absolute value of 1 J/g. The polyester particles may have one or more melting peaks at least one of which when measured on a DSC first heating scan has a heating curve departing from a baseline in the endothermic direction at a temperature of less than or equal to 200° C. The polyester particles may have an It.V. at their surface which is less than 0.25 dL/g higher than the It.V. at their center. The polyester particles may have not been solid stated. The melt processing device comprises a screw with a total length, L, a feed zone length in the range from 0.16L and 0.45L, a taper angle, $\phi$, in the range from 0.5 degrees and 5.0 degrees, and a compression ratio, CR, in the range from 2.0 and 4.0.

The polyester polymer of the invention contains ethylene terephthalate repeat units in the polymer chain. The polyester polymers comprises:

(a) a carboxylic acid component comprising at least 80 mole %, at least 90 mole percent, at least 92 mole percent, at least 93 mole percent, or at least 96 mole percent of the residues of terephthalic acid or derivatives of terephthalic acid, or mixtures thereof, and (b) a hydroxyl component comprising at least 80 mole %, at least 90 mole percent, at least 92 mole percent, at least 93 mole percent, or at least 96 mole percent of the residues of ethylene glycol, based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said product(s) add up to 100. The "residues" of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

Derivatives of terephthalic acid include $C_1$-$C_4$ dialkylterephthalates and $C_1$-$C_4$ dialkylnaphthalates, such as dimethylterephthalate.

In addition to a diacid component of terephthalic acid, derivatives of terephthalic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may contain such comonomers as isophthalic acid, naphthalene dicarboxylic acid, cyclohexanedimethanol, and diethylene glycol.

The polyester polymer particles may have at least two melting peaks on a DSC first heating scan, wherein one of said at least two melting peaks is a low peak melting point with a peak temperature within a range of 140° C. to 220° C., or within a range of 140° C. to 230° C., and having a melting endotherm area of at least the absolute value of 1 J/g. Polyester polymer particles with this characteristic are described in U.S. patent application Ser. No. 11/018,119 filed on Dec. 21, 2004, which is fully incorporated herein by reference. By melting point is meant the peak temperature of endotherms on a differential scanning calorimeter (DSC) which increases the temperature upward at a rate of 20° C./min on a sample weighing about 10 mg. It is not necessary to run a DSC analysis on the particles, but only that the particles have the stated morphology. The stated tests reveal the properties of the polymer and need only be run to determine whether or not a polymer has or does not have the stated characteristics.

In one example, the polyester polymer particles exhibit at least two melting peaks. The low peak melting point is considered to be Tm1 as explained further below, which is classified as a melting peak when the area under the heating curve on a DSC first heating scan is at least the absolute value of 1 J/g. If the area under the curve is less than 1 J/g, the uncertainty around whether a curve is truly a peak or not becomes too high. Moreover, one can determine that at least two peaks exist when the endotherm(s) on a DSC scan exhibit at least four slopes, a first slope departing from a baseline, a second slope of opposite sign from the first slope, and a third slope of opposite sign from the second slope, and a fourth slope of opposite sign from the third slope. The temperature locations of the peaks on each curve define the melting points on that heating curve. For the purposes of computing the area of the melting endotherms, the dividing point between two peaks is at the point between the peaks where the curve most closely approaches the baseline.

In this example, if two or more peaks appear on a heating curve from a DSC first heating scan, then the first peak is the low peak melting point Tm1, and the second peak is the high peak melting point Tm2 such that Tm1<Tm2. The low peak melting point of the polymer particles is within a range of 140° C. to 220° C., or within a range of 140° C. to 230° C. The low peak melting point of the polyester polymer may also have a peak melting point temperature in the range of 140° C. and 195° C., 140° C. and 200° C., 140° C. and 210° C., 150° C. and 195° C., 150° C. and 200° C., 150° C. and 210° C., 150° C. and 220° C., 150° C. and 230° C., 160° C. and 195° C., 160° C. and 200° C., 160° C. and 210° C., 160° C. and 220° C., 160° C. and 230° C., 170° C. and 195° C., 170° C. and 200° C., 170° C. and 210° C., 170° C. and 220° C., or 170° C. and 230° C.

In some instances, depending on the specific thermal history of the polyester resin pellets, the DSC heating curve obtained upon a DSC first heating scan may exhibit an endothermic shoulder on the low-temperature side of the principal endothermic melting peak rather than two separate and well defined melting peaks. A low-temperature endothermic shoulder of this type is defined by means of the curve obtained by taking the first derivative with respect to temperature of the original DSC curve. The shoulder appears as a peak in the derivative curve. With increasing temperature, the derivative curve departs the baseline (at temperature A) in the endothermic direction at a temperature less than or equal to 200° C., or less than or equal to 190° C., or less than or equal to 180° C., then achieves a maximum displacement from the baseline, and then reverses direction and approaches or returns to the baseline but does not cross the baseline. At still higher temperatures, the derivative curve reverses direction (at temperature B) and again bends towards the endothermic direction, marking the beginning of the primary melting peak in the original DSC curve. The heat of melting represented by the shoulder corresponds to the area under the original DSC curve between temperatures A and B, and must be greater than or equal to the absolute value of 1 J/g to be considered a true shoulder. Those skilled in the art recognize that minor instrumental noise in the original DSC curve can appear as high-amplitude short-duration spikes in the derivative curve. Such noise can be filtered out by requiring that all features in the derivative curve spanning less than 5° C. be ignored.

Alternatively, the polymer particles may have one or more melting points which, when measured on a DSC first heating scan, have a heating curve departing from a baseline in the endothermic direction at a temperature of less than or equal to 200° C., or less than or equal to 190° C., or less than or equal to 180° C. Polyester polymer particles with this characteristic are also described in U.S. patent application Ser. No. 11/018, 119. In this example, the DSC heating curve may exhibit only one melting point, or it may exhibit two melting points. In any event, the heat history of the particles is such that they exhibit at least one melting point which, when measured on a DSC first heating scan, displays a heating curve which begins to depart from the baseline at a temperature of less than or equal to 200° C. In this example, the area of the endotherm curve represented by the melting peak departing from the baseline below or equal to 200° C. is at least the absolute value of 1 J/g.

The area of the endotherm curve may also be at least the absolute value of 1.5 J/g, or at least the absolute value of 2 J/g.

Alternatively the polyester polymer particles have a surface and a center, and the It.V. at the surface of the particle may be less than 0.25 dL/g higher than the It.V. at the center of the particle. Polyester polymer particles with this characteristic are described in U.S. patent application Ser. No. 10/795,783 filed on Mar. 8, 2004, which is fully incorporated herein by reference. The polyester polymer particles may have an It.V. at the surface of the particle less than 0.20 dL/g higher than the It.V. at the center of the particle, an It.V. at the surface of the particle less than 0.15 dL/g higher than the It.V. at the center of the particle, an It.V. at the surface of the particle less than 0.10 dL/g higher than the It.V. at the center of the particle, or an It.V. at the surface of the particle less than 0.05 dL/g higher than the It.V. at the center of the particle. In this example, the It.V. of the polyester polymer at the surface of the particle can be much lower than the It.V. at the center of the particle. In another example, however, there is provided a polyester particle which has a small surface to center It.V. gradient in that the absolute value of the difference in the It.V. between the center of the pellet and the surface of the pellet is less than 0.25 dL/g, less than 0.20 dL/g, less than 0.15 dL/g, less than 0.10 dL/g, or less than 0.50 dL/g. In another example, in a bulk of particles having a volume of 1 cubic meter or more, the average of the differences between the It.V. of the surface of the particles and the It.V. of the center of the particles in the bulk is not greater than 0.25 dL/g, or not greater than 0.20 dL/g, or not greater than 0.15 dL/g, or not greater than 0.10 dL/g or not greater than 0.05 dL/g.

The surface of the pellet is defined as the outer 8 to 12% by mass, while the center is the inner 8 to 16% by mass around the particle center point. While the center point of an irregular shaped particle may be difficult to determine precisely, it is the best approximation of the intersection between most of the straight lines that can be drawn through the particle between the edges or corners having the longest distance from each other. To measure the It.V. of the surface and the center, a plurality of 10 pellets from a batch is gradually dissolved according to the procedure set forth below, the weighted average of all measured cuts within the first 8-12 mass % dissolved being the surface of the pellet is recorded as It.V. surface, and the weighted average of all measured cuts within the last 8-16 mass % being the center is recorded as the It.V. center, and gradient being the difference between It.V. surface less the It.V. center. The number of measurements taken within each range is not limited, and can be as few as one measurement. The GPC method described below is used to separately measure the It.V. of each portion dissolved. In this way, a gradient starting from the surface of the particle all the way through to the center of the particle may be measured, taking only a surface and a center cut or as many cuts throughout the particle as one desires. Alternately, the particle is sliced with a microtome, a piece of the surface is cut away, a piece of the center is cut away, and they are then separately measured by the GPC method described below.

A generalized method for determining the molecular weight gradient, as represented by the It.V. gradient, throughout the pellets is as follows. A plurality of pellets, for example five or 10 pellets, or even a single pellet can be placed in a small stainless steel wire mesh basket. When a plurality of pellets are used, the pellets should be substantially of the same size. The basket is placed into a small flask containing about for example, 3 to 4 mL of stirred GPC solvent (70% hexafluoroisopropanol, 30% methylene chloride) per gram of polyester such that the pellets are immersed in the solvent. This causes the outer layer of the pellets to become dissolved in the GPC solvent. After a period of time appropriate for the dissolution rate of the pellets, the basket is removed from the flask. The appropriate period of time is the time required to dissolve a desired weight fraction of the pellet. One skilled in the art will recognize that the appropriate time can be readily determined by doing a simple set of dissolution experiments. The procedure is sequentially repeated using fresh solvent for each cycle until the pellets are completely dissolved. The solution from each dissolution cycle ("cut") is diluted with additional GPC solvent to increase the volume to a constant amount for all samples, for example, 10.0 mL, such that most of the solutions have a concentration in the range from 0.3 to 0.5 mg/ml. The molecular weight distribution of each "cut" is measured by injecting 10 μL into the GPC. The It.V. is calculated from the $\langle M \rangle_w$ using the relations given below. The mass of polymer present in each "cut" is calculated as the chromatogram peak area for that "cut" divided by the total chromatogram peak area for all of the "cuts" of that sample.

The It.V. across the pellets is determined by measuring the weight-average molecular weight of the polyester by gel permeation chromatography (GPC) from which the It.V. can be calculated as described below. The GPC analysis is used to estimate the molecular weight of the polyester pellets for determining the molecular weight gradient from the surface to the center of the particles:

Solvent: 95/5 by volume methylene chloride/hexafluoroisopropanol+0.5 g/L tetraethylammonium nitrite Temperature: ambient Flow rate: 1 mL/min Sample solution: 4 mg polyester polymer in 10 mL methylene chloride/hexafluoroisopropanol azeotrope (~70/30 by vol)+10 μl toluene flow rate marker. For filled materials, the sample mass is increased so that the mass of polymer is about 4 mg, and the resulting solution is passed through a 0.45 μm Teflon filter.

Injection volume: 10 μL

Column set: Polymer Laboratories 5 μm PLgel, Guard+Mixed C

Detection: UV absorbance at 255 nm

Calibrants: monodisperse polystyrene standards, MW=580 to 4,000,000 g/mole, where MW is the peak molecular weight p1 Universal calibration parameters:

PS K=0.1278 a=0.7089

PET K=0.4894 a=0.6738

The universal calibration parameters are determined by linear regression to yield the correct weight average molecular weights for a set of five polyester polymer samples previously characterized by light scattering.

The calculation of inherent viscosity at 0.5 g/dL in 60/40 phenol/tetrachloroethane from the weight-average molecular weight, $\langle M \rangle_w$, is determined as follows:

$$Ih.V. = 4.034 \times 10^{-4} \langle M \rangle_w^{0.691}$$

The intrinsic viscosity (It.V. or $\eta_{int}$) may then be calculated from the inherent viscosity using the Billmeyer equation as follows:

$$It.V. = 0.5[e^{0.5 \times Ih.V.} - 1] + (0.75 \times Ih.V.)$$

The intrinsic viscosity values reported for the intrinsic viscosity gradient across the pellets, are set forth in dL/g units as calculated from the inherent viscosity at 25° C. at a polymer concentration of 0.50 g/100 mL of 60% phenol and 40% 1,1,2,2-tetrachloroethane, which is calculated from the GPC determined weight-average molecular weight. All other intrinsic viscosity values throughout this description describing the polyester It.V. are set forth in dL/g units as calculated from the inherent viscosity which was measured at 25° C. in 60/40 wt/wt phenol/tetrachloroethane.

The polyester polymers can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst.

The molten polymer from the melt phase polymerization may be allowed to solidify and/or obtain any degree of crystallinity from the melt. Alternatively, the molten polymer can be first solidified and then crystallized from the glass.

Whereas the conventional polyester process includes solid stating, the polyester polymer of the present invention may not be solid stated. In this example, the polyester polymer reaches an It.V. that is its maximum It.V. or very nearly so by the time the polyester polymer leaves the final polycondensation reactor. In other words, the It.V. of the polyester polymer pellets are not increased by more than 0.03 dL/g in any processing steps following the solidification that occurs after the final melt polycondensation reactor.

Once the particles have been dried, they are introduced into a melt processing device or apparatus to form molten polyester polymer, followed by forming an article such as a sheet or a molded part. Any conventional technique used to melt particles and form articles therefrom can be used. Suitable melt processing devices include extruders equipped with a barrel, one or more screws in the barrel, a motor to turn the screw, heating elements to direct heat through the barrel to the particles, and a die plate through which the molten polymer is forced. The die may be a sheet die, optionally connected to a thermoforming mold, or it can be a profile or fiber die. Alternately, it can be a die used in conjunction with an extrusion blow molding apparatus. Another melt processing device is an injection molding machine equipped with the same features, except a sprue is used instead of a die through which the polymer is forced into a runner system that directs the polymer into one or more mold cavities. An example of a molded part includes a bottle preform (parison).

Another melt processing device is an injection molding machine as above, except the molten polymer is directed from the exit of the extruder into an accumulation vessel (shooting pot), prior to being introduced into the sprue, runner system and one or more mold cavities.

The barrel of the melt processing device may contain one or more temperature zones. The temperature zone of maximum temperature applied along the length of the barrel is typically, but not necessarily, closest to the die plate in an extruder. The maximum temperature in the zones across the length of the barrel may range from a minimum sufficient to melt the pellets up to a temperature where the polymer degrades significantly or burns. Typically, in an extruder barrel, the maximum temperature applied to the barrel in the process of the invention can be as low as about 250° C., or 255° C., up to about 305° C. Suitable back pressures and shear rates vary depending upon the particular peak barrel temperature, desired throughput, the polymer composition, and the morphology of the particles. Back pressure, in this case, refers to the user defined pressure exerted on an injection molding screw to slow its retraction while turning. For example, with a low back pressure, the screw will quickly translate back and fill the melt cushion at the front of the screw as it turns. Conversely, high back pressures retard the screw's translation so it has to make more turns (and take more time) to fill the cushion. In general, backpressures may range from 0 to 1200 psig, or from 0 to about 700psig, or about 100 to 200 psig. Suitable screw speeds are within a range of 40 to 200 rpm, and suitable melt residence times in the barrel range from 30 seconds to 5 minutes.

In one example, the feed zone length of the screw is shortened as compared to the feed zone length required for processing solid-stated polyesters. The feed zone can be, for example, in the range of 0.16L and 0.50L, 0.16L and 0.45L, 0.16L and 0.40L, 0.20L and 0.50L, 0.20L and 0.45L, 0.20L and 0.40L, 0.30L and 0.50L, 0.30L and 0.45L, or 0.30L and 0.40L. If the feed zone length is too large problems with bubble formation and/or gel formation are greatly increased. If the feed zone length is too short, then the mass flow rate will decrease. Feed zone lengths below about 0.15L begin to produce unacceptable throughput losses for PET.

In one example, the transition angle, $\phi$, is in the range of 0.5 degrees and 5 degrees, 0.5 degrees and 4.5 degrees, 0.5 degrees and 4.0 degrees, 0.5 degrees and 3.5degrees, 0.5 degrees and 3.0 degrees, 0.5 degrees and 2.0 degrees, 0.8 degrees and 5 degrees, 0.8 degrees and 4.5 degrees, 0.8 degrees and 4.0 degrees, 0.8 degrees and 3.5 degrees, 0.8 degrees and 3.0 degrees, 1.0 degrees and 5 degrees, 1.0 degrees and 4.5 degrees, 1.0 degrees and 4.0 degrees, 1.0 degrees and 3.5 degrees, 1.0 degrees and 3.0 degrees, 1.0 degrees and 2.0 degrees, 1.25 degrees and 5 degrees, 1.25 degrees and 4.5 degrees, 1.25 degrees and 4.0 degrees, 1.25 degrees and 3.5 degrees, 1.25 degrees and 3.0 degrees, 1.1 degrees and 5 degrees, 1.5 degrees and 4.5 degrees, 1.5degrees and 4.0 degrees, 1.5 degrees and 3.5 degrees, or 1.5 degrees and 3.0 degrees. If the transition angle is too high, then mass flow rate will decrease. If the transition angle is too low, especially for a melt-phased only polyester, then the number of gel defects may increase.

In one example, the compression ratio, CR, is in the range of 2.0 and 5.0, 2.0 and 4.8, 2.0 and 4.6, 2.0 and 4.4, 2.0 and 4.0, 2.0 and 3.5, 2.2 and 5.0, 2.2 and 4.8, 2.2 and 4.6, 2.2 and 4.4, 2.2 and 4.0, 2.2 and 3.5, 2.4 and 5.0, 2.4 and 4.8, 2.4 and 4.6, 2.4 and 4.4, 2.4 and 4.0, 2.40 and 3.5, 2.6 and 5.0, 2.6 and 4.8, 2.6 and 4.6, 2.6 and 4.4, 2.6 and 4.0, 2.6 and 3.5, 2.7 and 5.0, 2.7 and 4.8, 2.7 and 4.6, 2.7 and 4.4, 2.7 and 4.0, 2.7 and 3.5, 2.8 and 5.0, 2.8 and 4.8, 2.8 and 4.6, 2.8 and 4.4, 2.9 and 5.0, 2.9 and 4.8, 2.9 and 4.6, 2.9 and 4.4, 2.9 and 4.0, 3.0 and 5.0, 3.0 and 4.8, 3.0 and 4.6, 3.0 and 4.4, or 3.0 and 4.0. If the compression ratio is too high, then the polyester resin is subject to excessive shear, molecular weight degradation, and a reduction in throughput rate. High shear can be an issue with PET because excessive shear heating can cause increased acetaldehyde formation. If the compression ratio is too low, then the gel or bubble count may be unacceptably high.

Although each screw design variable has been described separately, it is the interaction of these variables that also is important since there are trade-offs with each. Proper design must optimize around all simultaneously while trying to find the best screw combination that will allow colder melt temperatures. For example, from a screw design standpoint, to maintain a constant throughput rate for a given resin and barrel temperature, it has been found that the change in $\phi$+CR (i.e. the sum of the angle $\phi$ in degrees with the CR) should be about ⅓ that of the change in feed zone length where feed zone length is expressed in units of "diameters" (to express the relation in terms of fractional feed zone length f, multiply by 24 since this was the most commonly used L/D ratio used for the study). For example, if one decreases the feed zone length by 3D (i.e. 3 "turns"), then $\phi$+CR should be decreased by about 1 unit. See the Example section for more details. If this change is not made, the mass throughput rate will increase or decrease depending on the relative change. Compare this with reducing bubble defects where it is found that the best approach is to decrease feed zone length and/or increase CR (or φ). In this case the feed zone change required is in the opposite direction relative to CR and φ so constant mass throughput is not easily maintained. Part of the present invention is finding screw design parameters that maintain high mass throughput rates while reducing bubbles and gels.

The screw design of the present invention can also include distributive or dispersive mixing sections aimed at mixing ingredient/colorants or breaking up agglomerates respectively. Examples of mixing sections include Maddock, Saxon, pin, pineapple, wave, cavity transfer, mix-melt, and co-kneader, to name a few. These are usually added in the metering section or near the end of compression where the bulk of the polymer is already melted and help to eliminate any residual gels. Additionally, static or nozzle mixers, such as Koch or Kenix type mixers, can be added downstream of the screw to provide additional melt homogenization.

In addition to mixing sections, the screw can also have multiple parallel flights and/or sections of variable depth, to help modify melt behavior. Typically this takes the form of 2 flights in the transition section, and is commonly referred to as a "barrier" type screw. Multiple flights help to isolate the solid bed from the melt and provide additional melt efficiency. Similarly screw sections of variable depth help to provide variable compression and kneading to the melt.

The screw is housed in a barrel. The barrel is typically heated in order to melt the polyester polymer. Barrel temperatures may be, for example, in the range of 260° C. and 300° C., in the range of 265° C. and 290° C., in the range of 270° C. and 290° C., in the range of 275° C. and 290° C., in the range of 260° C. and 285° C., in the range of 265° C. and 285° C., in the range of 270° C. and 285° C., in the range of 275° C. and 285° C., in the range 260° C. and 280° C., in the range of 265° C. and 280° C., in the range of 270° C. and 280° C., or in the range of 275° C. and 280° C. Barrels are typically smooth walled, although grooved feed sections can be used to enhance feeding.

The It.V. of the polyester particles is suitable for container applications. The It.V. of the polyester particles is at least 0.60 dL/g. For example, the It.V. of the polyester particles may be in the range of 0.60 dL/g and 1.1 dL/g, 0.60 dL/g and 1.2 dL/g, 0.60 dL/g and 1.5 dL/g, 0.65 dL/g and 1.1 dL/g, 0.65 dL/g and 1.2 dL/g, 0.65 dL/g and 1.5 dL/g, 0.70 dL/g and 1.1 dL/g, 0.70 dL/g and 1.2 dL/g, 0.70 dL/g and 1.5 dL/g, 0.72 dL/g and 1.1 dL/g, 0.72 dL/g and 1.2 dL/g, 0.72 dL/g and 1.5 dL/g, 0.75 dL/g and 1.1 dL/g, 0.75 dL/g and 1.2 dL/g, 0.75 dL/g and 1.5 dL/g, 0.77 dL/g and 1.1 dL/g, 0.77 dL/g and 1.2 dL/g, 0.77 dL/g and 1.5 dL/g, 0.80 dL/g and 1.1 dL/g, 0.80 dL/g and 1.2 dL/g, or 0.80 dL/g and 1.5 dL/g.

The polyester polymer composition is made from at least 70% virgin polyester polymer, more preferably at least 75 wt. %, and can be 89 wt. % or more, or 95 wt. % or more virgin material, or entirely of virgin material.

The polyester polymer of the invention is partially crystallized to produce semi-crystalline particles. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, molten polymer from the melt phase polymerization reactor may be fed through a die plate and cut underwater, dewatered, and then immediately fed to a thermal crystallization reactor where the polymer is crystallized. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized. Optionally, the crystallized polyester may be solid stated according to known methods.

In one example, the particles are crystallized a degree of crystallinity of at least 25%, or at least 30%, or at least 32%. In many cases a degree of crystallinity does not exceed 45% or not more than 40%. In another example, the polyester particles have a percent crystallinity in the range of 5% and 44%, 5% and 40%, 5% and 35%, 5% and 30%, 10% and 44%, 10% and 40%, 10% and 35%, 10% and 30%, 15% and 44%, 15% and 40%, 15% and 35%, 15% and 30%, 20% and 44%, 20% and 40%, 20% and 35%, 20% and 30%, 30% and 44%, 30% of 40%, 30% and 35%, 35% and 44%, or 35% and 40%.

The shape of the polyester polymer particles is not limited, and can include regular or irregular shaped discrete particles without limitation on their dimensions, including flake, stars, spheres, spheroids, conventional pellets, needles, pastilles, and any other shape, but particles are distinguished from a sheet, film, preforms, strands or fibers.

The particles desirably have a number average weight in the range of 0.7 g/50 pellets and 2.5 g/50 pellets, 1.2 g/50 pellets and 2.0 g/50 pellets, or 1.4 g/50 pellets and 1.8/50 pellets. The volume of the particles is not particularly limited, but in one example, there is provided a bulk of particles occupying a volume of at least 1 cubic meter, or at least 3 cubic meters, or at least 5 cubic meters.

In the melt processing device to produce an article, or in the melt-phase process for making the polyester polymer, other components can be added to the composition of the present invention to enhance the performance properties of the polyester polymer. These components may be added neat to the bulk polyester, may be added as a dispersion in a liquid carrier or may be added to the bulk polyester as a polyester concentrate containing at least about 0.5 wt. % of the component in the polyester let down into the bulk polyester. The types of suitable components include crystallization aids, impact modifiers, surface lubricants, stabilizers, denesting agents, antioxidants, ultraviolet light absorbing agents, metal deactivators, colorants, nucleating agents, acetaldehyde lowering compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. In another example, additives include reheat agents, UV absorbers, anti-blocks, anti-stats, colorants, oxygen scavengers, acetaldehyde reducing agents, slips, nucleaters, electrostatic pinning agents, dyes, melt strength enhancers, processing aids, lubricants, or combinations thereof. All of these additives and many others and their use are well known in the art and do not require extensive discussion. Any of these compounds can be used in the present composition.

The screw has a length, L, and a diameter, D. In one example, the ratio of the length to diameter, L:D, is in the range of 18:1 and 36:1, 22:1 and 30:1, or 24:1 and 28:1.

In one example, feed zone length is defined as f*L and f is defined by the following equation:

$$f \leq 0.23 + 0.0011 * Tm1 + 0.62 * It.V.$$

where the units of Tm1 are degrees centigrade, the units of It.V. are dL/g, and f represents the fraction of the total length. The optimal feed length was surprisingly found to increase with increasing low melt peak temperature and increasing It.V.

In one example, a sheet produced in an extruder with a 1.5 inch diameter screw rotating at 100 rpm, a barrel temperature setpoint of 270° C., and extruding through a 12 inch die with a winding speed of 10 ft/min. has less than 100,000 gels per meter squared (gels/m$^2$) and less than 50 bubbles per minute (bubbles/min.) as measured with an optical scanner. In another example the gel count can be less than 80,000 gels/m$^2$, less than 60,000 gels/m$^2$, or less than 40,000 gels/m$^2$. In another example, the bubble count can be less than 45 bubbles/min., less than 40 bubbles/min., or less than 35 bubbles/min.

The measurement of gels per meter is conducted using an optical scanner attached at the end of the take-up roll. Gel counts using this method are substantially higher than traditional visual inspection because the optical scanner picks up defects near sub-micron size as well as numerous surface defects (e.g. die lines and chattermarks) from the casting roll.

Mass throughput rate (also referred to as "flow rate" or "output rate") can be measured by weighing the amount of material extruded in one minute. For both the gel count and mass throughput measurements, the results should be the average of two measurements.

Because the optical scanner cannot distinguish air bubbles from unmelts, the number of bubbles should be counted manually in the film over a one minute period of extrusion time.

In another example, for the melt processing device operated under specific feed zone length, taper angle, and compression ratio, and at a specific barrel temperature, a first feed rate of the polyester particles is equal to or greater than a second feed rate of a second polyester particles wherein the second polyester particles have the same composition and It.V. as the polyester particles except that the second polymer has been solid stated. "Solid-stated" in this case means that the second polyester has been manufactured such that at least 0.03 dl/g of the IV was obtained by solid-state polymerization. The first feed rate may be greater than the second feed rate by more than 2%, more than 3%, more than 4%, more than 5%, more than 6%, more than 8%, or more than 10%.

In another example, for the melt processing device operated under specific feed zone length, taper angle, and compression ratio, a first feed rate of the polyester particles fed to the melt processing device at a barrel temperature, T1, is equal to or greater than a second feed rate of a second polyester particles fed to the melt processing device at a barrel temperature, T2, wherein the second polyester particles have the same composition and It.V. as the polyester particles and the second polyester particles have been processed such that the It.V. of the second polyester particles increased by at least 0.03 dL/g in the solid-state and T2 is at least 5° C. higher than T1. In another example, T2 is at least 7° C. higher than T1, T2 is at least 10° C. higher than T1, or T2 is at least 12° C. higher than T1.

The polyester particles and the second polyester particles have the same composition provided that the carboxylic acid residues which constitute at least 97 mole percent of the carboxylic acid component are each present in amounts within plus or minus 1 mole percent in the polyester particles and the second polyester particles, and the hydroxyl residues which constitute at least 97 mole percent of the hydroxyl components are each present in amounts within plus or minus 1 mole percent in the polyester particles and the second polyester particles. For example, a polyester particles with 95 mole % TPA and 5 mole % IPA for the carboxylic acid component and 98 mole % EG for the hydroxyl component have the same composition as second polyester particles with 95.8 mole % TPA and 4.2 mole % IPA for the carboxylic acid component and 97.5 mole % EG for the hydroxyl component. The polyester particles and the second polyester particles have the same It.V. provided that the It.V. of each is within plus or minus 0.02 dL/g.

By using the particles of the invention along with the optimum screw design, specifically regarding feed zone length, taper angle, and compression ratio, the following advantages can be realized if the operating parameters in the melt processing device are adjusted accordingly:

1. Lower energy consumption to the melt processing device. In the case of an extruder or injection molding machine, the power (amperage) applied to the screw motor or to the heaters or to both can be lowered.

2. The residence time of the melt in a barrel can be lowered, or the overall cycle time of the melt can be lowered, thereby also reducing the acetaldehyde generated in the melt and possibly increasing throughput of the machine.

3. The screw may be rotated at higher revolutions without increasing power consumption, thereby also reducing the amount of acetaldehyde generated in the melt.

4. The temperature applied to the barrel by the heating element can be lowered, thereby also reducing the amount of acetaldehyde generated in the melt.

5. If desired, the processing step of solid state polymerization can be avoided completely.

6. The degree of crystallinity can be lowered, thereby saving energy costs to operate the crystallization equipment.

In each of these embodiments, the articles of manufacture are not limited, and include sheet and bottle preforms. The bottle preforms can be stretch blow molded into bottles by conventional processes. Thus, there is also provided in an embodiment the bottles made from the particles of the invention, or made by any of the processes of the invention, or made by any conventional melt processing technique using the particles of the invention.

Not only may containers be made from particles made according to the process of this invention, but other items such as sheet, film, bottles, trays, other packaging, rods, tubes, lids, filaments and fibers, and other molded articles may also be manufactured using the polyester particles of the invention. Made from polyethylene terephthalate, beverage bottles suitable for holding water or carbonated beverages, and heat set beverage bottles suitable for holding beverages which are hot filled into the bottle are examples of the types of bottles which are made from the crystallized pellets of the invention.

In one example, the melt processing device is a single or multistage injection molder and the article is a preform. In another example, the melt processing device is an extruder and the article is a sheet or film. The injection molder may operate, for example, at a melt residence time less than 300 seconds, less than 180 seconds, less than 120 seconds, or less than 90 seconds. The melt extruder may operate, for example, at a melt residence time less than 300 seconds, less than 180 seconds, less than 120 seconds, or less than 90 seconds.

Another embodiment of the invention is a process for melt processing polyester comprising (a) introducing polyester particles into a melt processing device, (b) melting the polyester particles in the melt processing device to produce a molten polyester, and (c) forming an article from the molten polyester. The polyester particles comprise (i) a carboxylic acid component comprising at least 80 mole percent of the residues of terephthalic acid, derivatives of terephthalic acid, or mixtures thereof, and (ii) a hydroxyl component comprising at least 80 mole percent of the residues of ethylene glycol, based on 100 mole percent of the carboxylic acid component residues and 100 mole percent of the hydroxyl component residues in the polyester particles. The polyester particles are further characterized by one or more of the following conditions. The polyester particles may have at least two melting peaks wherein one of the at least two melting peaks is a low peak melting point with a range from 140° C. to 220° C., or from 140° C. to 230° C., and having a melting endothermic area of at least the absolute value of 1 J/g. The polyester particles may have one or more melting peaks at least one of which when measured on a DSC first heating scan has a heating curve departing from a baseline in the endothermic direction at a temperature of less than or equal to 200° C. The polyester particles may have an It.V. at their surface which is less than 0.25 dL/g higher than the It.V. at their center. The polyester particles may have not been solid stated. The melt processing device comprises a screw with a total length, L, a feed zone length f*L (i.e. f multiplied by L), wherein f represents a fraction of the total screw that is the feed zone, a taper angle, $\phi$, in degrees, and a compression ratio, CR, such that the following formula is satisfied:

$$-0.4 \leq 7.64*f - 0.96*CR - \phi + 0.601 \leq +0.4$$

In another example, the following formula is satisfied.

$$-0.35 \leq 7.64*f - 0.96*CR - \phi + 0.601 \leq +0.35$$

In another example, the following formula is satisfied.

$$-0.3 \leq 7.64*f - 0.96*CR - \phi + 0.601 \leq +0.3$$

The term "$7.64*f - 0.96*CR - \phi + 0.601$" will be referred to as the "Screw Design Parameter" or SDP.

All other features described above apply to this embodiment as well, including polyester composition, melting peak characterization, It.V. gradient across particles, non-solid stating, melt processing device, screw design, feed zone length, taper angle, compression ratio, barrel temperature, polyester viscosity, virgin polyester, percent crystallinity, particle weight, other additives, L:D, feed zone length equation, gels and bubbles, feed rate of non-solid stated versus solid-stated polyester resin, injection molders and extruders and melt residence time as well as articles made.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., typically between 240° C. and 290° C., and at a pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer and/or oligomers. The monomer and/or oligomer forming reaction(s) are typically uncatalyzed in the direct esterification process and catalyzed in ester exchange processes.

Polycondensation catalysts may optionally be added in the esterification zone along with esterification/ester exchange catalysts. If a polycondensation catalyst was added to the esterification zone, it is typically blended with the diol and fed into the esterification reactor. Typical ester exchange catalysts, which may be used separately or in combination, include titanium alkoxides, tin (II) or (IV) esters, zinc, manganese, or magnesium acetates or benzoates and/or other such catalyst materials that are well known to those skilled in the art. Phosphorus containing compounds and some colorants may also be present in the esterification zone.

The resulting products formed in the esterification zone include bis(2-hydroxyethyl) terephthalate (BHET) monomer, low molecular weight oligomers, DEG, and water (or alcohol in the case of ester exchange) as the condensation by-product, along with other trace impurities formed by the reaction of the catalyst, if any, or starting materials and other compounds such as colorants, impurities in the starting materials or the phosphorus containing compounds. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. The water (or alcohol) is removed as the esterification reaction (or ester exchange) proceeds to drive the equilibrium toward products. The esterification zone typically produces the monomer and oligomer mixture, if any, continuously in a series of one or more reactors. Alternately, the monomer and oligomer mixture could be produced in one or more batch reactors. It is understood, however, that in a process for making PEN, the reaction mixture will contain monomeric species of bis(2-hydroxyethyl) naphthalate and its corresponding oligomers.

Once the ester monomer/oligomer is made to the desired degree of esterification, it is transported from the esterification reactors in the esterification zone to the polycondensation zone comprised of a prepolymer zone and a finishing zone. Polycondensation reactions are initiated and continued in the melt phase in a prepolymerization zone and finished in the melt phase in a finishing zone, after which the melt is solidified in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in many designs between the prepolymerization zone and the finishing zone is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. Other compounds such as phosphorus-containing compounds, cobalt compounds, and colorants can also be added in the prepolymerization zone. These compounds may, however, be added in the finishing zone instead of or in addition to the prepolymerization zone and esterification zone. In a typical DMT-based process, those skilled in the art recognize that other catalyst material and points of adding the catalyst material and other ingredients vary from a typical direct esterification process.

Typical polycondensation catalysts include the compounds of Sb, Ti, Ge, Li, Al, and Sn in an amount ranging from 0.1 to 500 ppm based on the weight of resulting polyester polymer.

This prepolymer polycondensation stage generally employs a series of one or more vessels and is operated at a temperature of between about 250° C. and 305° C. for a period between about five minutes to four hours. During this stage, the It.V. of the monomers and oligomers is increased up to about no more than about 0.5 dL/g. The diol byproduct is removed from the prepolymer melt using an applied vacuum ranging from 4 to 70 torr to drive the reaction to completion. In this regard, the polymer melt is sometimes agitated to promote the escape of the diol from the polymer melt. As the polymer melt is fed into successive vessels, the molecular weight and thus the intrinsic viscosity of the polymer melt increases. The pressure of each vessel is generally decreased to allow for a greater degree of polymerization in each successive vessel or in each successive zone within a vessel. However, to facilitate removal of glycols, water, alcohols, aldehydes, and other reaction byproducts, the reactors are typically run under a vacuum or purged with an inert gas. Inert gas is any gas which does not cause unwanted reaction or product characteristics at reaction conditions. Suitable gases include, but are not limited to, argon, helium and nitrogen.

The prepolymer is fed from the prepolymer zone to a finishing zone where the second half of polycondensation is continued in one or more finishing vessels generally, but not necessarily, ramped up to higher temperatures than present in the prepolymerization zone, to a value within a range of from 270° C. to 305° C. until the It.V. of the melt is increased from the It.V of the melt in the prepolymerization zone (typically 0.30 but usually not more than 0.5) to an It.V of at least 0.55. The It.V. of polyester compositions ranges from about 0.55 to about 1.15 dL/g. Preferably, the It.V. of the polyester particles ranges from 0.70 dL/g to 1.15 dL/g without solid state polymerization. The final vessel, generally known in the industry as the "high polymerizer," "finisher," or "polycondenser," is operated at a pressure lower than used in the prepolymerization zone, e.g. within a range of between about 0.2 and 4.0 torr. Although the finishing zone typically involves the same basic chemistry as the prepolymer zone, the fact that the size of the molecules, and thus the viscosity differs, means that the reaction conditions and vessel(s) may also differ. However, like the prepolymer reactor, each of the finishing vessel(s) is operated under vacuum or inert gas, and each is typically agitated to facilitate the removal of ethylene glycol, although the form of the agitation is suitable for higher viscosities.

The molten polymer from the melt phase polymerization may be allowed to solidify from the melt without further crystallization. Alternatively, the molten polymer can be first solidified and then crystallized from the glass. Alternatively the molten polymer may be pelletized and crystallized without first quenching to the glassy state.

Instead of making the polyester particle directly from the melt phase polymerization process, the particle may be made by melting post consumer recycled polyester polymer. However, since the molecular weight of bulk recycled polyester polymers can vary widely depending on their source or their service requirement, it is preferred that the polyester particle composition comprises at least 75 wt % virgin polyester polymer.

The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 180° C.; or any other means known in the art. Also, the polymer may be strain crystallized. In a preferred embodiment, the residual heat of the pellets is used to crystallize the pellets as they exit the pelletizing die so that no additional energy input is needed. In the case of an underwater pelletizer, temperature of the crystallization can be controlled by controlling the water temperature as well as the time that the pellets are exposed to the water.

Annealing of the polyester particles may be accomplished by maintaining them at elevated temperatures for an extended period of time. Hot polyester particles may be introduced to the annealing vessel following the pelletization and crystallization devices, optionally with additional heat being introduced to the particles. The temperature of the particles in the annealing vessel may be between 150° C. and 210° C., or between 150 C and 200 C, or between 150° C. and 190° C., or between 170 C and 210 C, or between 170° C. and 200° C., or between 170° C. and 190° C. The residence time of the polyester particles in the annealing vessel may be between 0.5 hours and 40 hours, or between 2 hours and 30 hours, or between 6 hours and 24 hours. The extent of annealing increases with increasing temperature and increasing residence time. One skilled in the art recognizes that some combinations of temperature and residence time may, in addition to annealing, produce solid-stated polyesters (i.e. the polyester may increase in molecular weight such that the It.V. increases by more than 0.03 dL/g).

Once the polyester particles are made with the stated properties that may be fed to an extruder suitable to make containers or sheet after being dried to remove moisture from the particles. Any conventional dryer can be used. The particles may be contacted with a flow of heated air or inert gas such as nitrogen to raise the temperature of the particles and remove volatile from inside the particles, and may also be agitated by rotary mixing blade or paddle.

One skilled in the art, recognizes that screws of the present invention may be produced by a machine shop to the specified feed zone length, taper angle, compression ratio, and other parameters. All common methods and materials for making the screw are assumed. For example, the screw might be made from stainless or various tool steels depending on strength, wear resistance and corrosion requirements. Metal alloys based on nickel, chromium, vanadium, molybdenum, lead, sulfur, various nitrides, and so forth are the most common. The screw may also be flame, precipitation or induction hardened, or it may be coated with a nickel, chrome or carbide finish. Cobalt or nickel based hardsurfacing alloys can also be applied, particularly in high wear or rebuilt areas of the screw.

One example of a screw design, based on modification of the "general purpose" type screw, is illustrated in FIG. 1. The screw is divided up into three main sections or zones, namely feed zone 3 where pellets are first added and conveyed, followed by transition or "compression" zone 4 where the screw flight tapers as the material is melted and compressed, and finally metering zone 5 where the molten material is further processed, pumped and homogenized before exiting the extruder or injection molder. Typically these length scales are written in terms of the fraction of the total length of the screw. Thus, for example, a feed zone that is ½ the length of the screw would be written as being "0.5 L" or "L/2" in length. Alternately the feed zone length is often expressed in terms of the number of screw "turns" or "diameters", particularly in the case of square-pitched screws (defined below). For example, a feed zone that is "10D" on a screw with a 1 inch diameter would have a length of 10 inches. If the total length L was 24 inches, then f would correspondingly be 0.42 (i.e. 10/24). There are many variations and modifications possible for a screw in terms of adding mixing sections, venting sections, multiple flights, etc., but the features shown in FIG. 1 are consistent in almost all single screw extruders/molders.

The screw is most commonly characterized in terms of its diameter D 8 and its total length L 9 (or more commonly the L:D ratio). It is noted that the parameters L and D (8 and 9 in FIG. 1) are fixed for a given extrusion or injection molding machine due to the constraints of the barrel dimensions. In contrast, there are a number of screw design elements that can be changed by the user. These include feed zone depth hf 1 and metering zone depth hm 2. More commonly, however, a screw design is characterized by the "compression ratio" or "CR" which is the ratio of hf/hm. Compression ratio is a measure of how much the screw compacts the resin during melting and transition.

Feed zone depth is a variable that can be used to control mass throughput of the screw. Generally, for a constant CR, a deeper feed zone depth will allow for greater mass throughput, although pressure generation is reduced. This is more of an issue with extrusion screws where the screw must be able to pump the material through a restrictive die or orifice, but it can be an issue with injection molding screws as well. Typically feed depth and/or CR are adjusted to assure sufficient pressure generation for the dies/molds in question. Feed zone depth also cannot be so great as to weaken the screw. If screw depths become too great in the feed zone, the screw can become structurally weakened and not be able to withstand the torsional stresses incurred during normal operation.

The distance of the screw from flight to flight (6) is termed the "pitch". Generally speaking most screws in use are "square pitch" screws whereby the pitch of the screw is equal to the diameter of the screw (this is particularly true in the feed zone). As an example, a square pitch screw having an L/D of 24:1 will have a pitch equal to 1 diameter. As a consequence, for every rotation or turn around the screw, the flight translates 1 diameter in length down the barrel. Square pitched screws are preferred due to their good all around performance, although there is no limitation imposed on the present invention. In many cases it may be advantageous to have a higher and/or variable pitch section, particularly in the transition region, in order to increase conveying rate.

Finally, the transition angle 7 represents the rate or slope at which the transition zone increases/tapers with regards to the root diameter. Larger transition angles are needed for faster melting resins to compensate for the rapid densification of the pellet bed into a continuous molten mass. They also generate more pressure in the feed zone which helps to consolidate the bed and force out air trapped between the pellets. As is found in the present invention, if the transition does not match with the melting rate of the material, the extrudate is more likely to contain bubbles and/or unmelts. Transition angle can be reported in traditional angular units (e.g. degrees, radians) or as a slope (e.g. inches/turn). Higher $\phi$ values also normally imply shorter transition zones for a given compression ratio. For the case of screws with multiple transition regions of differing taper, it is assume that $\phi$ represents the initial transition zone since it has the greater impact on feed stability.

The invention may now be further understood by reference to the following non-limiting illustrative examples.

EXAMPLES

The intrinsic viscosity (It.V.) values described throughout this description are set forth in dL/g unit as calculated from the inherent viscosity (Ih.V.) measured at 25° C. in 60/40 wt/wt phenol/tetrachloroethane. Polymer samples are dissolved in the solvent at a concentration of 0.25 g/50 mL. The viscosity of the polymer solution is determined using a Viscotek Modified Differential Viscometer. A description of the operating principles of the differential viscometers can be found in ASTM D 5225. The inherent viscosity is calculated from the measured solution viscosity. The following equations describe these solution viscosity measurements, and subsequent calculations to Ih.V. and from Ih.V. to It.V:

$$\eta_{inh} = [ln(t_s/t_0)]/C$$

where
$\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube $t_0$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0} ln(\eta_r/C)$$

where
$\eta_{int}$=Intrinsic viscosity
$\eta_r$=Relative viscosity=$t_s/t_0$
$\eta_{sp}$=Specific viscosity=$\eta_r - 1$ Instrument calibration involves replicate testing of a standard reference material and then applying appropriate mathematical equations to produce the "accepted" Ih.V. values.

Calibration Factor=Accepted Ih.V. of Reference Material/Average of Replicate Determinations Corrected Ih.V.=Calculated Ih.V.×Calibration Factor The intrinsic viscosity (It.V. or $\eta_{int}$) may be estimated using the Billmeyer equation as follows:

$$\eta_{int} = 0.5[e^{0.5 \times Corrected\ Ih.V.} - 1] + (0.75 \times Corrected\ Ih.V.)$$

The reference for calculating intrinsic viscosity (Billmeyer relationship) is *J. Polymer Sci.*, 4, 83-86 (1949).

Pellet melting temperature and the degree of crystallinity are determined using Differential Scanning Calorimetry (DSC) following procedures well known in the art. The sample weight for this measurement is 10.0±0.1 mg and the sample consists of either (1) a portion of a single pellet, or more preferably (2) a sample taken from several grams of cryogenically ground pellets. The first heating scan is performed. The sample is heated from approximately 25° C. and proceeds upward to about 290° C. at a rate of 20° C./minute. The absolute value of the area of the melting endotherms (one or more) minus the area of any crystallization exotherms is determined. This area corresponds to the net heat of melting and is expressed in Joules/gram. The heat of melting of 100% crystalline PET is taken to be 119 Joules/gram, so the weight fraction crystallinity of the pellet is calculated as the net heat of melting divided by 119. To obtain the weight. % crystallinity, the weight fraction crystallinity is multiplied by 100. Unless otherwise stated, the melting point in each case is also determined using the same DSC scan.

The percent crystallinity is calculated from both the low melting point peak Tm1 and any high melting peaks (e.g. Tm2, Tm3) if present. The peaks are defined in order from lowest to highest temperature such that Tm1<Tm2<Tm3, etc.

The resins used in the study consisted of melt phased resins of varying viscosity and Tm1 as well as solid-stated resins of varying viscosity and Tm1. The resins are each PET modified with nominally 2.7 to 3.1 mole percent DEG based upon 100 mole percent hydroxyl component. Resin 2 is modified with nominally 3 mole percent CHDM based upon 100 mole percent carboxylic acid component and Resin 8 is modified with nominally 2 mole % CHDM. The remaining resins were modified with nominally 2.6 to 2.9 mole percent isophthalic acid based upon 100 mole percent carboxylic acid component. Resin descriptions are compiled in Table I.

TABLE I

Resin Description

| Resin # | ItV (dl/g) | Tm1 (C.) | polymerization |
|---|---|---|---|
| 1 | 0.75 | 182 | melt phase |
| 2 | 0.76 | 240 | solid state |
| 3 | 0.82 | 187 | melt phase |
| 4 | 0.80 | 240 | solid state |
| 5 | 0.75 | 205 | melt phase |
| 6 | 0.84 | 210 | melt phase |
| 7 | 0.84 | 240 | solid state |
| 8 | 0.82 | 240 | solid state |

The screw designs for all experiments are listed in Table II. There were 5 screw designs used in the first trial, all "general purpose" screws without mixing sections attached and having feed zone depths of approximately 0.24 inches. Feed zone length, compression ratio and transition angle, $\phi$, were all varied to determine their effects on extrudate quality.

Comparative Examples are denoted by the letter "C" before the run number.

TABLE II

Screw Designs

| Screw | L/D | D (in) | Feed Length | Trans. Length | Meter Length | Meter depth hm (in) | CR | Taper | SDP | Type |
|---|---|---|---|---|---|---|---|---|---|---|
| A | 24 | 1.5 | 8.5D (0.35L) | 8D | 7.5D | 0.075 | 3.2 | 0.8 deg | −0.61 | GP (gen. purpose) |
| B | 24 | 1.5 | 12D (0.5L) | 8D | 4D | 0.075 | 3.2 | 0.8 deg | 0.49 | GP |
| C | 24 | 1.5 | 12D (0.5L) | 7D | 5D | 0.092 | 2.6 | 0.8 deg | 1.07 | GP |
| D | 24 | 1.5 | 12D (0.5L) | 4.5D | 7.5D | 0.092 | 2.6 | 1.25 deg | 0.62 | GP |
| E | 24 | 1.5 | 8.5D (0.35L) | 7D | 8.5D | 0.092 | 2.6 | 0.8 deg | −0.03 | GP |
| F | 24 | 1.5 | 5D (0.21L) | 12D | 7D | 0.105 | 2.4 | 0.5 deg | −0.64 | barrier screw |
| G | 24 | 1.5 | 8D (0.33L) | 9D | 7D | 0.080 | 3.0 | 0.7 deg | −0.47 | Maddock mixer |
| H | 24 | 1.5 | 8D (0.33L) | 8D | 8D | 0.080 | 3.0 | 0.8 deg | −0.57 | Saxon mixer |
| W | 25 | 3.9 | 11D (0.44L) | 5D | 7D | 0.57 | 2.3 | 0.7 deg | 0.93 | Low IV$^{Tm}$ |

TABLE II-continued

Screw Designs

| Screw | L/D | D (in) | Feed Length | Trans. Length | Meter Length | Meter depth hm (in) | CR | Taper | SDP | Type |
|---|---|---|---|---|---|---|---|---|---|---|
| X | 25 | 3.9 | 9D (0.36L) | 4D | 10D | 0.57 | 2.3 | 1.0 deg | 0.01 | Modified Low IV |

Example and Comparative Examples 7 through 41

Comparison of Screw and Resin Variables

A designed experiment was performed to determine the effects of screw design, resin IV, barrel temperature, and resin melting temperature on extrudate output and extrudate quality. The experiment was conducted on a 1.5 inch Killion extruder with an L/D=24:1 and a 12 inch film die. An extruder was used instead of an injection molding machine because of the improved instrumentation and wider range of screw designs available. Furthermore, the extruder also had an Optical Control Systems Model FS-3 optical scanner (Witten, Germany) attached at the end of the take-up roll on which the number of gels were measured for each sample. Pressure taps at the end of the feed and transition zones were used to gauge material behavior in the barrel.

All resins were dried at 150° C. for 4 hrs. prior to processing using a forced air desiccant type dryer. In order to keep the pellets at constant temperature, the hopper was kept closed and dry air at 150° C. was circulated into the hopper from an auxiliary drying system. This prevented thermal drift and moisture uptake during the experiments and helped to maintain run to run consistency.

For all of the runs, the screw was set at 100 RPM with a constant barrel temperature of either 270° C. or 280° C. No breaker plate was used during the extrusion trial in order to simulate the higher throughput rates and reduced back pressure of an injection molding machine (later trials with the breaker plate in place did not show a significant difference). The take-up speed of the film was kept at a constant 10 ft/s as it passed through the optical scanner. Mass throughput rate (also referred to as "flow rate" or "output rate") was measured by weighing the amount of material extruded in one minute. For both the gel count and mass throughput measurements, the results reported are the average of two measurements. Because the optical scanner could not distinguish air bubbles from unmelts, the number of bubbles was counted manually in the film over one minute of extrusion time.

The optical scanner was set at maximum resolution and could detect gels down to the sub-micron level. Because the film was cast and not polished, some of the die lines and "roll chatter" were also picked up by the detector as defects, thereby inflating the numbers somewhat. Nevertheless, the total defect count expressed on a per area basis, correlated well with visual ratings of the film defect count.

TABLE III

Extrusion Results for Melt-Phase Resins

| Run # | Screw | Resin | Barrel temp (° C.) | Output (lb/min) | Gel count 1000 gels/m² | Bubbles (per min.) |
|---|---|---|---|---|---|---|
| 1 | A | 1 | 270 | 1.26 | 31.8 | 2 |
| 3 | A | 3 | 270 | 1.29 | 53.7 | 0 |

TABLE III-continued

Extrusion Results for Melt-Phase Resins

| Run # | Screw | Resin | Barrel temp (° C.) | Output (lb/min) | Gel count 1000 gels/m² | Bubbles (per min.) |
|---|---|---|---|---|---|---|
| 5 | A | 1 | 270 | 1.27 | 28.5 | 0 |
| 6 | A | 1 | 280 | 1.26 | 23.1 | 6 |
| 8 | A | 3 | 280 | 1.245 | 37.5 | 0 |
| 12 | B | 3 | 270 | 1.45 | 77.5 | 0 |
| 16 | B | 3 | 280 | 1.465 | 66.0 | 4 |
| 28 | D | 3 | 270 | 1.50 | 84.0 | 1 |
| 32 | D | 3 | 280 | 1.505 | 64.0 | 17 |
| 34 | E | 1 | 270 | 1.405 | 55.0 | 20 |
| 36 | E | 3 | 270 | 1.40 | 75.0 | 1 |
| 38 | E | 1 | 280 | 1.43 | 34.0 | 53 |
| 40 | E | 3 | 280 | 1.40 | 63.0 | 3 |
| C10 | B | 1 | 270 | 1.445 | 69.0 | 208 |
| C14 | B | 1 | 280 | 1.465 | 50.0 | 212 |
| C18 | C | 1 | 270 | 1.56 | 68.3 | 363 |
| C20 | C | 3 | 270 | 1.575 | 97.0 | 172 |
| C22 | C | 1 | 280 | 1.615 | 82.0 | 500 |
| C24 | C | 3 | 280 | 1.60 | 74.0 | 107 |
| C26 | D | 1 | 270 | 1.49 | 59 | 169 |
| C30 | D | 1 | 280 | 1.52 | 39 | 170 |

TABLE IV

Extrusion Results for Solid-Stated Resins

| Run # | Screw | Resin | Barrel temp (° C.) | Output (lb/min) | Gel count 1000 gels/m² | Bubbles (per min.) |
|---|---|---|---|---|---|---|
| C2 | A | 2 | 270 | 1.245 | 102 | 1 |
| C4 | A | 4 | 270 | 1.265 | 129 | 5 |
| C7 | A | 2 | 280 | 1.275 | 44.6 | 0 |
| C9 | A | 4 | 280 | 1.265 | 69.5 | 5 |
| C11 | B | 2 | 270 | 1.378 | 120 | 0 |
| C13 | B | 4 | 270 | 1.37 | 159 | 15 |
| C15 | B | 2 | 280 | 1.44 | 72 | 2 |
| C17 | B | 4 | 280 | 1.42 | 101 | 8 |
| C19 | C | 2 | 270 | 1.55 | 149.3 | 64 |
| C21 | C | 4 | 270 | 1.55 | 123 | 78 |
| C23 | C | 2 | 280 | 1.335 | 150 | 0 |
| C25 | C | 4 | 280 | 1.585 | 139 | 48 |
| C27 | D | 2 | 270 | 1.43 | 157 | 9 |
| C29 | D | 4 | 270 | 1.445 | 149 | 29 |
| C31 | D | 2 | 280 | 1.485 | 100 | 3 |
| C33 | D | 4 | 280 | 1.495 | 115 | 6 |
| C35 | E | 2 | 270 | 1.32 | 115 | 0 |
| C37 | E | 4 | 270 | 1.245 | 116 | 0 |
| C39 | E | 2 | 280 | 1.39 | 78 | 0 |
| C41 | E | 4 | 280 | 1.335 | 93 | 1 |

Inspection of the data shows that the melt phased resins 1 and 3 were, on average, lower in gel type defects, but much higher in bubble defects. The lower crystallinity meant that the screw did not have to work as hard to eliminate the high melting gels. Furthermore, the screws with the longer feed zone lengths (e.g. screw B, C and D) were much more prone to bubbles than the shorter feed screws (A and B).

Resins 1 and 3 also contained fewer gel defects at 270 C barrel temperature than the solid-stated resins 2 and 4 at 280° C. The lower melting point and reduced crystallinity of these melt phased resins made it much easier to extrude high quality film at lower temperatures, regardless of screw type.

Comparison of screw B and C (or A and E) illustrate how a change of CR with all other variables being constant, affected overall properties. It is observed that increasing CR decreases defects but also causes a slight decrease in throughput. Similarly comparing C and D illustrates the effect of varying transition angle. Data show that increasing $\phi$ has a similar effect as increasing CR, however $\phi$ is more efficient given that more defects are eliminated with less reduction in throughput. Thus, transition angle modification, an often overlooked variable, is actually a more effective control variable.

The effect of feed zone length can be ascertained by comparing A with B (or C with E). Increasing feed zone length significantly increases throughput but also significantly increases defect concentration. Most injection molding screws for PET use a feed zone length that is approximately 0.5L (12D on a 24:1L/D). Such a screw will give high output but this data clearly illustrates how such a long feed zone is detrimental to extrudate quality.

IV effects are illustrated by comparing resins 1 and 3 for the melt phase case, and 2 and 4 for solid stated case. It is observed that the lower IV resins tended to have more bubble defects when feed zone length is longer.

To better illustrate the data, the results in Table III and Table IV were curve fit using a linear model (plus interactions) and the resulting equations complied in Table V (note that bubbles required the use of a logarithmic transform to improve the quality of fit). Terms that were not found to be significant to the model were removed during the fitting process. Goodness-of-fit as determined by the $R^2$ parameter was good for all of the models. The parameters in the fit include feed zone length ("Feed") in units of "diameters", the compression ratio (CR), the transition angle $\phi$ denoted as "phi") in units of degrees, IV (or It.V.), melting temperature Tm1 (denoted as "Tm") in units of degrees Celsius, and the processing temperature (T), also in units of degrees Celsius. While Feed is defined in terms of diameters D, it can be converted to f, a fraction-of-total screw length basis, by multiplying its coefficient by 24.

TABLE V

Model Fits

| Response | Model Fit | $R^2$ |
|---|---|---|
| Mass Throughput M (lbs/min) | M = 1.28 − 0.00096 * Tm + 0.05 * Feed − 0.184 * CR + 0.0018 * T − 0.133 * phi | 0.86 |
| Bubbles (per minute) | bubbles = exp(−4.017 + 1.735 * Feed − 1.798 * CR + 0.415 * T − 148.9 * IV + 0.0694 * Tm − 0.00558 * Feed * Tm − 0.00196 * T * Tm + 0.6674 * IV * Tm − 2.364 * phi) − 3 | 0.74 |
| gels (k/minute) | gels = −1943 + 12 * Tm + 8.6 * Feed − 32.3 * CR + 6.2 * T − 30.7 * phi + 181 * IV − 0.041 * T * Tm | 0.89 |
| Screw amps | amps = 47.3 − 0.014 * Tm + 1.05 * Feed − 8.9 * CR + 0.078 * T − 0.14 * phi − 36.1 * IV + 18.5 * CR * IV − 0.43 * Feed * CR | 0.77 |

For the case of mass throughput rate, the relative effects of each variable can be compared directly by looking at the coefficients in the model since there are no interaction terms. For example, increasing feed zone length by 1 turn increases mass flow by about 0.05 lbs/min. To achieve a similar increase via CR or taper angle would require decreasing either the CR by 0.3 units or the transition angle by approximately 0.3 degrees. An approximate rule of thumb obtained from this data is that, to maintain a constant mass flow rate at a given T (and Tm1), the change in $\phi$+CR should be about ⅓ the change in Feed (in units of D). Thus if Feed is increased by 1 turn, the sum of taper angle and CR needs to increase by 0.33 units to keep throughput rate approximately constant. If increased by more than this, the mass throughput will decrease.

Decreasing Tm1 also increases throughput rate by about 0.01 lbs/min for every 10° C. decrease. This is approximately 5% higher on average for a Tm1=180° C. melt phase resin as compared with a solid-stated resin (Tm1=240° C.). This higher throughput with regards to lower Tm1 resins also gives them an edge when running colder barrel temperatures. For example, a 10 C drop in barrel temperature T, decreases throughput by about 0.02 lbs/min. This is offset by a 20° C. drop in Tm1 of the base resin. Since the difference in Tm1 between the melt phase resins of this invention and the solid-stated resins is 40 to 60° C., this means that a resin with low Tm1 can be run faster than the solid-stated resins, even when the barrel temperature is colder.

While it is clear from the data that longer feed lengths give higher output rate, there is a tradeoff in terms of the number of bubble and gel defects. The lower Tm1 resins are already significantly lower in gels due to their lower starting crystallinity, so emphasis is more around designing the screw for bubble reduction. Also, It.V. has a significant impact on bubbles with higher It.V. resins being more immune to their formation. Thus feed zone length should be shortened to decrease the bubbles, but other variables adjusted to maintain throughput rate at a high level. Inspection of the bubble model is a little more complicated given the interaction terms and exponential dependence, but it shows that, for a Tm1=180° C. resin, the number of bubble defects will decrease by approximately 60/minute, for every 1 turn decrease in feed zone length (although this varies with It.V. due to interaction effect). Similarly, the bubble count decreases by about 10/minute and 20/minute for a 0.1 unit increase in CR and phi respectively and by 30/minute for a 10° C. increase in Tm of the resin.

The bubble count decreases by about 240/minute for every 0.1 dl/g increase in It.V. As observed in Table III, samples of high It.V. with low Tm have much lower bubble count than the low It.V. analogues (compare C10 with 12). Consequently more screw modification in terms of decreased Feed and/or increased CR and taper angle is needed when the It.V. is low. For high It.V. resins, simply increasing CR and/or taper to higher levels is preferred as this has less of a negative impact on throughput rate.

Comparative Examples and Examples 55 through 107

Extrusion Trials with Mixing Screws

This series of experiments was performed using conditions almost identical to those used in Runs 1 through 41. The only differences were (1) the breaker plate was installed (2) the barrel temperature was kept constant at 280 C, (3) two new melt phase resins having higher Tm1 were added (resins 5 and 6 in Table I) and (4) three additional "mixing" screws were evaluated. The mixing screws include a barrier screw, a GP screw with a Maddock dispersive mixer, and a GP screw with a Saxton-type distributive mixer. The screws are denoted as F, G, and H in Table II respectively. For G and H, the mixing sections were in the metering zone, approximately 2 turns from the end of the screw.

Results are compiled in Table VI. For screws A through E, the results are very similar to that of Runs 1 through 41 illustrating that the breaker plate did not have a major effect. It was observed that the shorter feed zone screws worked much better for the low Tm1 resins. Furthermore, for the high It.V. resins, increasing CR and/or φ significantly reduced the defect level as well. For the lower It.V. resins, a shorter feed zone was also required.

TABLE VI

Second Run Extrusion Results for Melt-Phase Resins

| Run # | Screw | Resin | Barrel temp (° C.) | Output (lb/min) | Gel count 1000 gels/m² | Bubbles (per min.) |
|---|---|---|---|---|---|---|
| 55 | E | 1 | 280 | 1.38 | 31 | 58 |
| 57 | E | 3 | 280 | 1.4 | 47 | 0 |
| 59 | E | 5 | 280 | 1.44 | 76 | 18 |
| 60 | E | 6 | 280 | 1.42 | 60 | 1 |
| 61 | A | 1 | 280 | 1.24 | 37 | 5 |
| 63 | A | 3 | 280 | 1.24 | 53 | 0 |
| 65 | A | 5 | 280 | 1.3 | 73 | 6 |
| 66 | A | 6 | 280 | 1.26 | 64 | 0 |
| 69 | B | 3 | 280 | 1.435 | 75 | 30 |
| 72 | B | 6 | 280 | 1.475 | 72 | 22 |
| 81 | D | 6 | 280 | 1.495 | 88 | 17 |
| 83 | D | 3 | 280 | 1.48 | 75 | 42 |
| 87 | D | 6 rep | 280 | 1.5 | 80 | 44 |
| 88 | F | 5 | 280 | 1.465 | 89 | 0 |
| 89 | F | 6 | 280 | 1.415 | 77 | 0 |
| 91 | F | 3 | 280 | 1.345 | 50 | 0 |
| 93 | F | 1 | 280 | 1.325 | 34 | 0 |
| 94 | F | 5 rep | 280 | 1.425 | 84 | 0 |
| 95 | G | 5 | 280 | 1.47 | 66 | 0 |
| 96 | G | 6 | 280 | 1.415 | 57 | 0 |
| 98 | G | 3 | 280 | 1.39 | 51 | 0 |
| 100 | G | 1 | 280 | 1.4 | 36 | 0 |
| 101 | G | 5 rep | 280 | 1.455 | 62 | 0 |
| 102 | H | 5 | 280 | 1.37 | 83 | 0 |
| 103 | H | 6 | 280 | 1.305 | 55 | 0 |
| 105 | H | 3 | 280 | 1.315 | 60 | 0 |
| 107 | H | 1 | 280 | 1.305 | 37 | 0 |
| C67 | B | 1 | 280 | 1.415 | 55 | 150 |
| C71 | B | 5 | 280 | 1.47 | 91 | 44 |
| C73 | C | 1 | 280 | 1.545 | 53 | 241 |
| C75 | C | 3 | 280 | 1.56 | 74 | 214 |
| C77 | C | 5 | 280 | 1.48 | 80 | 0* |
| C78 | C | 6 | 280 | 1.515 | 72 | 85 |
| C79 | C | 5 rep | 280 | 1.565 | 74 | 150 |
| C80 | D | 5 | 280 | 1.455 | 97 | 21 |
| C85 | D | 1 | 280 | 1.51 | 50 | 179 |
| C86 | D | 5 rep | 280 | 1.505 | 90 | 75 |

*Experienced feed hopper problems during run C77, repeat experiment, run C79, shows high bubble count.

TABLE VII

Second Run Extrusion Results for Solid-Stated Resins

| Run # | Screw | Resin | Barrel temp (° C.) | Output (lb/min) | Gel count 1000 gels/m² | Bubbles (per min.) |
|---|---|---|---|---|---|---|
| C56 | E | 2 | 280 | 1.35 | 162 | 4 |
| C58 | E | 4 | 280 | 1.33 | 164 | 25 |
| C62 | A | 2 | 280 | 1.26 | 145 | 5 |
| C64 | A | 4 | 280 | 1.25 | 150 | 10 |
| C68 | B | 2 | 280 | 1.355 | 117 | 36 |
| C70 | B | 4 | 280 | 1.345 | 116 | 78 |
| C74 | C | 2 | 280 | 1.555 | 124 | 163 |
| C76 | C | 4 | 280 | 1.535 | 111 | 242 |
| C82 | D | 4 | 280 | 1.43 | 128 | 86 |
| C84 | D | 2 | 280 | 1.435 | 176 | 41 |
| C90 | F | 4 | 280 | 1.09 | 151 | 0 |
| C92 | F | 2 | 280 | 1.09 | 51 | 0 |
| C97 | G | 4 | 280 | 1.23 | 118 | 0 |
| C99 | G | 2 | 280 | 1.35 | 157 | 0 |
| C104 | H | 4 | 280 | 1.27 | 84 | 0 |
| C106 | H | 2 | 280 | 1.295 | 69 | 0 |

In the case of resins 5 and 6—which had Tm1 values intermediate between the other resins—the defect behavior was typically intermediate between that of the other resins. While these resins ran better than the low Tm1 resins on the long feed zone screws, they did not work quite as well on the short feed screws.

For the barrier screw F, the feeding behavior was found to be markedly different depending on the resin. The high Tm1 solid-stated resins (2 and 4) had the lowest feed rate of all, with the intermediate Tm1 resins (5 and 6) being the best. Clearly the barrier flight was a better match for the intermediate Tm1 resins. Bubble defects were non-existent for all of the materials due to the shorter feed zone length. Gel counts were the lowest for the low Tm1 resins.

The mixing screws G and H behaved similarly to the barrier screw although not as pronounced. Bubbles were non-existent, and the mass output rates reduced for the high Tm1 material. Gel counts were slightly lower for resins 1 and 3 although the difference between resins was small.

Example 47 and Comparative Examples 45, 46 and 48 Extrusion Blow Molding Trial

For Comparative Examples 45 and 46, an 80 mm diameter general purpose screw, normally used for polyethylene, was used to extrusion blow mold resins 3 and 4 (Table I) on a Bekum extrusion blow molding machine. This screw was a 24:1 L/D with 12 feed flights, 4 transition flights, then 9 flights including decompression, mixing and metering. The compression ratio was 3.2:1. For the solid-stated resin 7 (Comparative Example 46) no unmelts were observed down to a barrel temperature of 500 F (260 C). In contrast, with Comparative Example 45, extreme unmelts and bubbles were evident with the melt phased resin 3 due to the long feed zone length (0.48L).

For Example 47 and Comparative Example 48, the same resins (3 and 4 respectively) were run using a barrier screw having a feed zone of 5D (0.21L) a CR of 2.1 and an effective taper angle of 0.7 degrees. The screw also contained a mixing section. Both ran essentially free of defects to a barrel temperature as low as 480 F (249 C). The low Tm1 melt phase resin ran well because of shorter feed zone length.

Comparative Examples 42 through 44 Injection Molding Trial

Resins 1, 3 and 7 were processed on a Husky LX300 machine with a 25:1 L/D, 100 mm diameter screw running a 32 cavity tool with a 74.5 gram part weight. This screw had a 12D feed section (feed length=0.48L) and a compression ratio of 2.6. The taper angle φ was approximately 0.9 degree and dispersive mixing sections were included in the metering zone. The SDP was calculated to be 0.82. Resin was dried at 150 C for 6 hours prior to molding. All extruder heater setpoints were 270 C. Screw speed was about 52 rpm, screw cushion was 25 mm, and backpressure was 130 psi.

For Comparative Example 42, resin 7 was run with a 26.4 s cycle and no preform defects were observed. This is a traditional high It.V. solid-stated resin used in the industry.

For Comparative Example 43, resin 1 was run with a 25.9 s cycle time. Out of 3 total shots, 16 preforms with unmelts, 12 preforms with endcap haze, and 2 preforms with splay were observed. Two bubbles were also observed in other shots produced at these conditions. This resin is a low It.V., low Tm1 resin of the present invention but was run using a screw design outside the scope of the present invention.

For Comparative Example 44, resin 3 was run with a 26.5 second cycle. Out of 30 shots (960 preforms), six were found to have unmelt defects. This resin is a high It.V., low Tm1 resin of the present invention, but, as with Comparative Example 43, the screw design was incorrect. Note that the higher It.V. resins are found to have fewer defects than the low It.V. resin, although this lower level was still unacceptable for a commercial process.

Example 109 Preform Injection Molding on a 42 mm Lab Machine

In this example, preforms were molding using a 42 mm screw on a Husky LX160 molding machine. The screw had an L/D of 25:1, a feed zone length of 0.37L, a feed depth of 0.34 inches, and a transition angle of approximately 1 degree, resulting in an SDP of −0.01. The screw contained multiple mixing sections including a wave section which varied in CR from 1.25 to 3.75 (average CR=2.5). The screw was square pitched with a variable pitch transition. A variety of resins including resins 1 through 7 in Table I were run on this machine using a range of conditions. In virtually all cases, there were no significant defects in the preforms due to the shorter feed zone length, relatively high transition angle (coupled with a moderate CR), and relatively small diameter of the screw.

Comparative Examples 170 and Example 111

Preform Injection Molding

This experiment was performed using conditions similar to that in Comparative Example 42 but with two different screw designs. Only Resin 1 was evaluated in this experiment (since it has the highest propensity for bubbles). For all of the runs, a 1.5 second dead time was provided by adjusting the screw rotation speed to ensure that the screw fully recovered during plastication. Parts were also evaluated in terms of the number of bubble, splay and unmelt type defects.

Comparative Example 110 consists of the same screw used in Comparative Example 42. The injection molding cycle time was 24.4 seconds. Bubble and splay type defects for this screw were relatively low in number, but unmelt defects were high.

Example 111 consisted of a square pitched screw normally used for mixing in colorants and additives. It had a feed zone that was 0.4L (ca. 10D) and had multiple mixing sections. The metering zone included a variable depth "wave" section in which varied from an effective CR of about 0.9 to an upper value of approximately 5.5 (average of 3.2). The transition angle leading up to the initial part of the metering zone was approximately 0.7 degrees resulting in an SDP of approximately zero. This screw resulted in preforms having no defects of any kind due to the shorter feed zone length and high average CR. In contrast, an injection molding cycle time equivalent to that in Comparative Example 110 could not be obtained even with the screw speed setting maximized, which illustrates how shortening the feed and increasing CR can reduce throughput rate. While this screw provides an excellent example of how to reduce defects, a more improved version would have a slightly reduced CR or longer feed length in order to retain the higher throughput rate. Alternately, a steeper transition angle with a reduced CR would provide solids bed support while allowing for more throughput. Finally, an increased feed depth could help boost throughput rate if needed.

Comparative Examples 49 through 54

Injection Molding of Crisper Trays

For Comparative Examples 49 through 54, a Cincinnati Milacron CM725 injection molding machine was used to mold large refrigerator crisper trays using resins 1 through 6 (Table I) respectively. The screw used is a general purpose screw with no mixing or barrier components having a 20:1 L/D and a 3.4 compression ratio. The screw had 10 turns in the feed zone (0.5L), 5 turns in the transition, and 5 in the metering zone. Crisper trays molded with resins 1 and 3 (Comparative Examples 49 and 51) showed extreme bubbles and unmelts. Trays molded with the higher Tm1 melt-phased and solid-stated resins (i.e. 2, 4, 5 and 6) had far fewer bubble and unmelt defects. The screw design involved a feed zone length (0.5L) which was too long for the low Tm1 resins.

Examples and Comparative Examples 112-117

Preform Injection Molding on a 100 mm Molding Machine

For these examples, 42 gram preforms were molded on a Husky E100, 48 cavity injection molding machine. Screws W and X were used for the study along with Resins 3, 6 and 8. Resin 8 was used as the solid stated control for the experiment. Screw W is a commercially available Husky Low IV™ screw that had been problematic in the past with the low Tm1 resins with regards to bubbles and defects. As measured, it has a feed zone that is 11 D (0.44L) long, a transition that is approximately 5 D, an intermediate barrier section that is roughly 4 D long, and then a final metering section. The screw also contains a UCC type mixer at the end. Screw X was a modification of this design to reflect the components of the present invention. The feed zone was shortened by approximately two flights, and the taper angle was increased slightly from 0.7 to 1 degree to reflect the faster melting of the melt phased resins. This reduced the SDP from 0.93 to 0.01. Extra flights that were "saved" in the feed and transition zones were added to the metering zone. Otherwise, however, the screw design was the same as with W.

For this experiment, resin was dried at 150° C. and molded into preforms. Total defect level (bubbles and unmelts), throughput rate, cycle time and acetaldehyde were all measured for the preforms. Defect level was expressed as a percentage of the preforms that exhibited the defect per visual inspection.

To exacerbate different defect types, 2 different sets of run conditions. The first, denoted as the "bubble" condition was designed to increase bubble formation in the preforms. It consisted of a nominal 30 s cycle time (11 seconds of hold time and 6 seconds cooling time) and a nominal screw speed of 40 to 55 RPM (this was adjusted as needed to ensure full screw recovery). The barrels were set at 540 F and the extruder back position was nominally 200 mm. The second condition was the "unmelt" condition and it consisted of a shorter 25 second nominal cycle time (7.5 seconds hold time and 4 seconds cooling). Screw speed was 45 to 60 RPM and the extruder was set with Zone 1 at 500 F, Zone 2 at 515 F and Zone 3 at 530 F. The extruder back position was also 200 mm nominal.

Throughput rate was determined by setting the back pressure at 250 psi and the screw at 50 RPM and measuring the time to complete screw recovery after a shot using the optimum temperature conditions (see below).

Optimum run conditions for the machine, defined as conditions yielding the lowest possible total cycle time while maintaining preform defect levels below 2%, also were determined. The goal here was to reduce the resin temperature as much as possible while maintaining quality preforms (i.e. no haze, or defects). Preforms were also assessed for acetaldehyde (AA) generation and were grouped by cavities that typically produced higher AA levels vs. those that tended to be low. AA values were averaged over these cavities respectively.

Results are compiled in Table VIII for the various run conditions and including the optimized values. The modified screw X having the low SDP consistently produced preforms with no defects under almost all conditions, in addition to plasticating material at a faster rate. In contrast, for screw W, the screw back pressure had to be increased considerably to keep the defects from forming whereas screw X could be run well even at low back pressure. As observed it was also possible to reduce the melt temperature by almost 20 F with screw X versus screw W. In most cases this also led to a lower cycle time.

TABLE VIII

Comparison of Molding Results

|  | Screw W | | | Screw X | | |
| --- | --- | --- | --- | --- | --- | --- |
|  | C115 Resin 3 | C116 Resin 6 | C117 Resin 8 (SS) | 112 Resin 3 | 113 Resin 6 | 114 Resin 8 (SS) |
| Average Defect Level: | | | | | | |
| "Bubble" Condition | 13% | 1% | 5.8% | 0% | 0% | 0% |
| "Unmelt" Condition | 18% | 13.5% | 11.9% | 0.1% | 0% | 0% |
| Optimized Run Conditions: | | | | | | |
| Cycle Time: | 25 s | 25 s | 25 s | 24 s | 26 s | 24 s |
| Defect Level: | 2% | 2.2% | 1.6% | 0% | 0% | 0% |
| Barrel Temp: | 555 F. | 555 F. | 555 F. | 535 F. | 535 F. | 535 F. |
| Back Pressure (psi): | 775 | 775 | 555 | 250 | 250 | 250 |
| Throughput (kg/hr): | NT | 360 | 325 | 380 | 410 | 375 |
| Acetaldehyde (Optimized): | | | | | | |
| high cavity (avg ppm) | 5 | 3.4 | 10.3 | 3.4 | 2.9 | 7.3 |
| low cavity (avg ppm) | 3.6 | 2.8 | 7.3 | 2.8 | 2.0 | 6.0 |

The invention has been described in detail with particular reference to various embodiments thereof, but it will be understood that variations and modifications can be effected within the spirit and scope of the invention.

What is claimed is:

1. A process for melt processing a polyester comprising:
   a. introducing polyester particles into a melt processing device;
   b. melting the polyester particles in the melt processing device to produce a molten polyester; and
   c. forming an article from the molten polyester wherein the polyester particles comprise:
   (i) a carboxylic acid component comprising at least 80 mole percent of the residues of terephthalic acid, derivatives of terephthalic acid, or mixtures thereof, and
   (ii) a hydroxyl component comprising at least 80 mole percent of the residues of ethylene glycol, based on 100 mole percent of the carboxylic acid component residues and 100 mole percent of the hydroxyl component residues in the polyester particles and the polyester particles are further characterized by one or more of the following:
   1. have at least two melting peaks wherein one of the at least two melting peaks is a low peak melting point with a range from 140° C. to 220° C. and having a melting endotherm area of at least the absolute value of 1 J/g;
   2. have one or more melting peaks at least one of which when measured on a DSC first heating scan, has a heating curve departing from a baseline in the endothermic direction at a temperature of less than or equal to 200° C.;
   3. have an It.V. at their surface which is less than 0.25 dL/g higher than the It.V. at their center; or
   4. have not been solid stated;

wherein the melt processing device comprises a screw with a total length, L, a feed zone length in the range from 0.16L and 0.45L, a taper angle, $\phi$, in the range from 0.5 degrees and 5.0 degrees, and a compression ratio, CR, in the range from 2.0 and 5.0.

2. The process of claim 1, wherein the polyester particles comprise:
   (i) a carboxylic acid component comprising at least 90 mole percent of the residues of terephthalic acid, derivatives of terephthalic acid, or mixtures thereof, and
   (ii) a hydroxyl component comprising at least 90 mole percent of the residues of ethylene glycol, based on 100 mole percent of the carboxylic acid component residues and 100 mole percent of the hydroxyl component residues in the polyester particles, wherein the polyester particles have not been solid stated, and wherein the melt processing device further comprises a barrel which houses the screw at a barrel temperature in the range of from 260° C. and 290° C.

3. The process of claim 1, wherein the polyester particles have an It.V. in the range from 0.60 dL/g and 1.2 dL/g.

4. The process of claim 1, wherein the polyester particles have a $T_{m1}$ in the range from 150° C. and 210° C.

5. The process of claim 1, wherein the polyester particles comprise greater than 70 weight percent virgin polyester.

6. The process of claim 1, wherein the polyester particles have a percent crystallinity in the range from 5% and 44%.

7. The process of claim 1, wherein the polyester particles are pellets and the pellets weigh in the range from 0.7 g/50 pellets and 2.5 g/50 pellets.

8. The process of claim 1, wherein the polyester particles comprise a reheat agent, UV absorbers, anti-blocks, anti-stats, colorants, oxygen scavengers, acetaldehyde reducing agents, slips, nucleaters, electrostatic pinning agents, dyes, melt strength enhancers, processing aids, lubricants, or combinations thereof.

9. The process of claim 1, wherein the screw further has a diameter, D, and a ratio L:D in the range from 18:1 and 36:1.

10. The process of claim 1, wherein the screw has a feed zone length in the range from 0.16L and 0.40L.

11. The process of claim 1, wherein the taper angle, $\phi$, is in the range from 1.0 degrees and 2.0 degrees.

12. The process of claim 1, wherein the compression ratio, CR, is in the range from 2.0 and 4.0.

13. The process of claim 1, wherein the feed zone length is defined as f*L and f is defined by the following equation:

$$f \leq 0.23 + 0.0011 * Tm1 + 0.62 * It.V.$$

where the units of Tm1 are degrees centigrade, the units of It.V. are dL/g, and f represents the fraction of the total length.

14. The process of claim 1, wherein a sheet produced in a extruder with a 1.5 inch diameter screw rotating at 100 rpm, a barrel temperature setpoint of 270° C., and extruding through a 12 inch die has less than 100,000 gels/m² and less than 50 bubbles/minute.

15. The process of claim 1, wherein the melt processing devices is a single or multi-stage injection molder and the article is a perform, or
the melt processing device is an extruder and the article is a sheet or film.

16. A process for melt processing a polyester comprising:
 a. introducing polyester particles into a melt processing device;
 b. melting the polyester particles in the melt processing device to produce a molten polyester; and
 c. forming an article from the molten polyester
wherein the polyester particles comprise:
 (i) a carboxylic acid component comprising at least 80 mole percent of the residues of terephthalic acid, derivatives of terephthalic acid, or mixtures thereof, and
 (ii) a hydroxyl component comprising at least 80 mole percent of the residues of ethylene glycol,
based on 100 mole percent of the carboxylic acid component residues and 100 mole percent of the hydroxyl component residues in the polyester particles and the polyester particles are further characterized by one or more of the following:
 1. have at least two melting peaks wherein one of the at least two melting peaks is a low peak melting point with a range from 140° C. to 220° C. and having a melting endotherm area of at least the absolute value of 1 J/g;
 2. have one or more melting peaks at least one of which when measured on a DSC first heating scan, has a heating curve departing from a baseline in the endothermic direction at a temperature of less than or equal to 200° C.;
 3. have an It.V. at their surface which is less than 0.25 dL/g higher than the It.V. at their center; or
 4. have not been solid stated;
wherein the melt processing device comprises a screw with a total length, L, and a feed zone length, f*L, wherein f represents the fraction of the total screw that is the feed zone, a taper angle, $\phi$, in degrees, and a compression ratio, CR, such that the following formula is satisfied:

$$-0.4 \leq 7.64 * f - 0.96 * CR - \phi + 0.601 \leq +0.4.$$

17. A process for melt processing a polyester comprising:
 a. introducing polyester particles into a melt processing device;
 b. melting the polyester particles in the melt processing device to produce a molten polyester; and
 c. forming an article from the molten polyester
wherein the polyester particles comprise:
 (i) a carboxylic acid component comprising at least 80 mole percent of the residues of terephthalic acid, derivatives of terephthalic acid, or mixtures thereof, and
 (ii) a hydroxyl component comprising at least 80 mole percent of the residues of ethylene glycol,
based on 100 mole percent of the carboxylic acid component residues and 100 mole percent of the hydroxyl component residues in the polyester particles and the polyester particles are further characterized by one or more of the following:
 1. have at least two melting peaks wherein one of the at least two melting peaks is a low peak melting point with a range from 140° C. to 230° C. and having a melting endotherm area of at least the absolute value of 1 J/g;
 2. have one or more melting peaks at least one of which when measured on a DSC first heating scan, has a heating curve departing from a baseline in the endothermic direction at a temperature of less than or equal to 200° C.;
 3. have an It.V. at their surface which is less than 0.25 dL/g higher than the It.V. at their center; or
 4. have not been solid stated;
wherein the melt processing device comprises a screw with a total length, L, a feed zone length in the range from 0.16L and 0.45L, a taper angle, $\phi$, in the range from 0.5 degrees and 5.0 degrees, and a compression ratio, CR, in the range from 2.0 and 5.0.

* * * * *